(12) United States Patent
Ooi et al.

(10) Patent No.: US 7,719,657 B2
(45) Date of Patent: May 18, 2010

(54) LIQUID CRYSTAL LENS ELEMENT AND OPTICAL HEAD DEVICE

(75) Inventors: Yoshiharu Ooi, Chiyoda-ku (JP); Yuzuru Tanabe, Chiyoda-ku (JP); Hiromasa Sato, Koriyama (JP); Takuji Nomura, Koriyama (JP); Ryuichiro Shimizu, Koriyama (JP)

(73) Assignee: Asahi Glass Company, Limited, Tokyo (JP)

( * ) Notice: Subject to any disclaimer, the term of this patent is extended or adjusted under 35 U.S.C. 154(b) by 870 days.

(21) Appl. No.: 11/589,088

(22) Filed: Oct. 30, 2006

(65) Prior Publication Data

US 2007/0146625 A1 Jun. 28, 2007

Related U.S. Application Data

(63) Continuation of application No. PCT/JP2005/008060, filed on Apr. 27, 2005.

(30) Foreign Application Priority Data

Apr. 30, 2004 (JP) ............................. 2004-136075

(51) Int. Cl.
*G02F 1/13* (2006.01)

(52) U.S. Cl. ................... 349/200; 349/202; 349/5

(58) Field of Classification Search .................. 349/200
See application file for complete search history.

(56) References Cited

U.S. PATENT DOCUMENTS

| | | | |
|---|---|---|---|
| 5,416,757 A | 5/1995 | Luecke et al. | |
| 7,289,260 B2 * | 10/2007 | Kaufman et al. | 359/319 |
| 7,388,822 B2 | 6/2008 | Ooi et al. | |
| 7,403,332 B2 * | 7/2008 | Whitehead et al. | 359/443 |
| 2005/0226122 A1 | 10/2005 | Ooi et al. | |
| 2007/0109489 A1 | 5/2007 | Nomura et al. | |
| 2007/0182915 A1 | 8/2007 | Osawa et al. | |
| 2007/0183293 A1 | 8/2007 | Murata et al. | |

FOREIGN PATENT DOCUMENTS

| | | |
|---|---|---|
| EP | 0 537 904 A2 | 4/1993 |
| EP | 0 918 248 A2 | 5/1999 |
| JP | 62-129815 | 6/1987 |
| JP | 5-205282 A | 8/1993 |
| JP | 5-323261 A | 12/1993 |
| JP | 7-77031 | 3/1995 |

(Continued)

OTHER PUBLICATIONS

U.S. Appl. No. 11/625,005, filed Jan. 19, 2007, Ooi et al.

(Continued)

*Primary Examiner*—David Nelms
*Assistant Examiner*—David Y Chung
(74) *Attorney, Agent, or Firm*—Oblon, Spivak, McClelland, Maier & Neustadt, L.L.P.

(57) ABSTRACT

The present application relates to a liquid crystal lens element and an optical head device, in particular order, to a liquid crystal lens capable of switching the focal length among a plurality of different focal lengths according to switching of applied voltage among a plurality of applied voltages, and an optical head device employing the liquid crystal lens, for writing and/or reading an information to/from an optical recording medium.

9 Claims, 8 Drawing Sheets

FOREIGN PATENT DOCUMENTS

| | | |
|---|---|---|
| JP | 9-230300 | 9/1997 |
| JP | 9-230300 A | 9/1997 |
| JP | 10-026705 A | 1/1998 |
| JP | 2000-231009 A | 8/2000 |
| JP | 2002-357804 | 12/2002 |
| JP | 2003-115127 | 4/2003 |
| JP | 2003-115127 A | 4/2003 |
| JP | 2003-149443 | 5/2003 |
| JP | 3656131 | 6/2005 |

OTHER PUBLICATIONS

Tryggve Baak, "Silicon oxynitride; a material for GRIN optics", Applied Optics, vol. 21, No. 6, XP-002469340, Mar. 15, 1982, pp. 1069-1072.

U.S. Appl. No. 11/621,128, filed Jan. 9, 2007, Nomura et al.

* cited by examiner

Optical path difference OPD (λ)

Transmission wavefront

Incident wavefront (A) $V_{+1}$  (B) $V_0$  (C) $V_{-1}$ (A) $V_{+2}$  (B) $V_{+1}$  (C) $V_0$  (D) $V_{-1}$  (E) $V_{-2}$

LIQUID CRYSTAL LENS ELEMENT AND OPTICAL HEAD DEVICE

BACKGROUND ART

As examples of an optical recording medium (hereinafter referred to as "optical disk") having an information recording layer formed on a surface of light-incident side, and a transparent resin covering the information recording layer, e.g. optical disks for CD and optical disks for DVD are widely used. Further, in an optical head device for writing and/or reading an information to/from the optical disks for DVD, e.g. a laser diode of 660 nm wavelength band as a light source and an objective lens having a NA (numerical aperture) of from 0.6 to 0.65, are employed.

Heretofore, as optical disks for DVD, an optical disk having a single information recording layer and having a cover thickness (the thickness of cover layer) of 0.6 mm (hereinafter referred to as "single layer DVD optical disk"), and an optical disk (read-only type or readable-writable type) having two information recording layers (hereinafter referred to as "double layer DVD optical disk") have been developed. In the double layer DVD optical disk, the distance between information recording layers is 55±15 μm and the information recording layers are formed at positions corresponding to cover thicknesses of 0.56 mm and 0.63 mm in the light-incident side.

By the way, in a case of writing and/or reading to/from a double layer DVD optical disk by using an optical head device having an objective lens optimally designed to have minimum aberration for a single layer DVD optical disk having a cover thickness of 0.6 mm, a spherical aberration is generated according to the difference of the cover thickness and convergence of incident light to an information recording layer is deteriorated. In particular, in a case of double-layer DVD optical disk of writing type, deterioration of convergence causes decrease of converging power density, which causes a writing error, such being a problem.

In recent years, in order to improve recording density of an optical disk, an optical disk having a cover thickness of 100 μm (hereinafter referred to as "single layer BD optical disk") has been developed. An optical head device for writing and/or reading to/from such a single layer BD optical disk, employs e.g. a laser diode of 405 nm wavelength band as a light source and an objective lens having a NA of 0.85. In this case, if the cover thickness varies ±5 μm within the single layer BD optical disk, a large spherical aberration of about 50 mλ is generated in terms of RMS (Root Mean Square) wavefront aberration, which causes a problem that convergence of incident light on the information recording layer is deteriorated.

Further, in a case of double layer optical disk of recording type (hereinafter referred to as "double layer BD optical disk") having cover thickness of 100 μm and 75 μm, a large spherical aberration generated according to the difference of the cover thickness, causes a writing error, such being a problem.

Heretofore, as means for correcting a spherical aberration caused by the difference of the cover thickness of e.g. such an optical disk, a method of employing a movable lens group or a liquid crystal lens, has been known.

(I) For example, in order to carry out correction of spherical aberration by using a movable lens group, an optical head device 100 shown in FIG. 12 for writing and/or reading to/from an optical disk D, has been proposed (for example, refer to Patent Document 1).

The optical head device 100 comprises a light source 110, an optical system 120 of various types, a photo-acceptance element 130, a control circuit 140 and a modulation/demodulation circuit 150, and further, a first and a second movable lens groups 160 and 170. The first movable lens group 160 includes a concave lens 161, a convex lens 162 and an actuator 163, which exhibits a focal-length variable lens function that a power of the movable lens group 160 is continuously changeable from positive (convex lens) to negative (concave lens) by moving the convex lens 162 fixed to the actuator 163 in an optical axis direction.

By disposing the movable lens group 160 in an optical path to an optical disk D, it becomes possible to adjust a focal point of incident light to an information recording layer of the optical disk D having a different cover thickness, and thus, to correct a spherical aberration containing a power component.

However, in the case of employing the movable lens group 160, there has been a problem that the size of the optical head device 100 becomes larger since the pair of lenses 161 and 162 and the actuator 163 are required, and the mechanical design for the movable lens becomes complicated.

(II) Further, in order to correct a spherical aberration caused by the difference of cover thickness between an optical disk for DVD and an optical disk for CD, an optical head device employing a liquid crystal lens 200 as shown in FIG. 13, has been proposed (for example, refer to Patent Document 2).

The liquid crystal lens 200 has a construction that it comprises a substrate 230 having a flat surface on which a transparent electrode 210 and an alignment film 220 are formed, a substrate 260 having a curved surface symmetric about an axis and having a surface shape S(r) represented by the following formula being a power series of a radius r:

$$S(r) = \alpha_1 r^2 + \alpha_2 r^4 + \alpha_3 r^6 + \quad (1)$$

wherein $r^2 = x^2 + y^2$ $\alpha_1, \alpha_2, \alpha_3, \ldots$ : constant on which a transparent electrode 240 and an alignment film 250 are formed, and a nematic liquid crystal 270 sandwiched by the substrates 230 and 260.

By the way, in the liquid crystal lens 200, when a voltage is applied between the transparent electrodes 210 and 240, alignment of molecules of the liquid crystal 270 changes and the refractive index of the liquid crystal 270 changes. As a result, a transmission wavefront of incident light changes in accordance with refractive index difference between the substrate 260 and the liquid crystal 270.

Here, the refractive index of the substrate 260 equals to the refractive index of the liquid crystal 270 when no voltage is applied. Accordingly, when no voltage is applied to the liquid crystal, transmission wavefront is not changed from that of incident light. On the other hand, when a voltage is applied between the transparent electrodes 210 and 240, a refractive index difference Δn is generated between the substrate 260 and the liquid crystal 270, and a distribution of optical path difference of transmission light corresponding to Δn×S(r) is generated (refer to Formula (1) for S(r)). Accordingly, it is possible to correct an aberration by fabricating the surface shape S(r) of the substrate 260 so as to correct a spherical aberration caused by the difference of cover thickness of an optical disk D, and by adjusting the refractive index difference Δn according to applied voltage.

However, in the case of liquid crystal lens 200 described in FIG. 13, since the refractive index change of the liquid crystal 270 in response to applied voltage is at most about 0.3, it is necessary to increase the concave-convex height of S(r) to generate a large optical path difference distribution Δn×S(r) corresponding to a power component for changing a focal point of incident light. As a result, the layer of liquid crystal 270 becomes thicker and a response speed of optical path change in response to applied voltage becomes slower. Particularly, for writing and/or reading to/from a single layer or a double layer DVD optical disk or a BD optical disk, response within 1 second is required to correct a wavefront aberration generated due to variation of cover thickness or switching of recording layer type between a single layer type and a double layer type, which has been a problem.

Further, in the case of liquid crystal lens 200, it is possible to reduce aberration correction amount, namely, optical path difference distribution by using the liquid crystal lens to correct only spherical aberration from which power component is eliminated, whereby it is possible to reduce the thickness of the liquid crystal layer, which is advantageous for fast response speed. However, in a case of fabricating surface shape S(r) of the substrate 260 so as to correct only spherical aberration, when an optical axis of an objective lens for converging incident light on an information recording layer of an optical disk, and an optical axis of the liquid crystal lens are misaligned to each other, a coma aberration is generated. Particularly, at a time of tracking operation in which the objective lens moves about ±0.3 mm in a radial direction of the optical disk, a large aberration due to the misalignment with the liquid crystal lens occurs, and there occurs a problem that convergence on the information recording layer is deteriorated to prevent writing and/or reading.

(III) By the way, in order to develop a substantial lens function capable of changing also a power component corresponding to focal point change of incident light without increasing the thickness of liquid crystal layer, an optical modulation element is also proposed (for example, refer to Patent Document 3). Further, in order to correct spherical aberration generated due to the difference between the cover thicknesses of DVD optical disk and CD optical disk, an optical head device employing an optical modulation element is also proposed. FIG. 14 shows an optical modulation element 300.

The optical modulation element 300 comprises two transparent substrates 310 and 320 substantially in parallel with each other and a liquid crystal 330 sandwiched between them, and a surface of the transparent substrate 310 in the liquid crystal side constitutes a concave-convex portion 340 having a concentric circular blaze shape, and an electrode 350 and an alignment film 360 are formed on each surface in the liquid crystal side of the two transparent substrate 310 and 320. Further, the liquid crystal 330 has an alignment direction substantially in parallel with the transparent substrates at a time of no electric field application, and the alignment direction is substantially perpendicular to the transparent substrates when an electric field is applied.

Here, by configuring any one of the ordinary refractive index $n_o$ and the extraordinary refractive index $n_e$ of the liquid crystal 330 to be substantially equal to the refractive index of the concave-convex portion 340 of the transparent substrate having the blaze shape, the refractive index difference between the liquid crystal 330 and the concave-convex portion 340 changes from $\Delta n(=n_e-n_o)$ to zero between at a time of no electric field application and at a time of electric field application. For example, by making the refractive index of the concave-convex portion 340 to be $n_o$, and making the depth of the concave-convex portion 340 to be $\Delta n \times$(depth of the concave-convex portion)=(wavelength of light in vacuo), the optical modulation element 300 functions as a Fresnel lens providing a diffraction efficiency of about 100% at a time of no voltage application. On the other hand, when a voltage is applied, the refractive index of the liquid crystal 330 becomes $n_o$ and the element does not function as a Fresnel lens and transmits entire light. As a result, by switching the presence and absence of applied voltage to the electrodes of the optical modulation element 300, it is possible to switch focal point between two focal points. By employing such an optical modulation element 300 in an optical head device, convergence to information recording layers of optical disks having different cover thicknesses for DVD and CD, is improved. As a result, it is possible to write and/or read optical disks for DVD and CD by employing an objective lens for DVD.

Accordingly, by employing an optical modulation element 300, it is possible to switch the focal point between two positions by switching presence and absence of the applied voltage, but switching of the focal point to a position between them has been difficult. As a result, it has not been possible to reduce a spherical aberration in a case of cover thickness of from 0.56 mm to 0.63 mm required for a single layer and a double layer DVD optical disk, to be an RMS wavefront aberration level of at most 30 m$\lambda$. Further, also in a case of a single layer or a double layer BD optical disk, it has not been possible to reduce a spherical aberration generated when the cover thickness varies ±5 μm, to an RMS wavefront aberration level of at most 50 m$\lambda$. As a result, it has not been possible to solve a problem that a large spherical aberration generated due to the difference of cover thickness cannot be sufficiently corrected, which causes a writing error.

Patent Document 1: JP-A-2003-115127
Patent Document 2: JP-A-5-205282
Patent Document 3: JP-A-9-230300

DISCLOSURE OF THE INVENTION

Problems to be Solved by the Invention

The present invention has been made considering the above-mentioned circumstances, and it is an object of the present invention to provide a liquid crystal lens element capable of realizing a small-sized element having no movable portion, and having a lens function enabling to switch a focal length among at least three focal lengths according to an applied voltage. Further, it is an object of the present invention to provide an optical head device employing the liquid crystal lens element, which corrects a spherical aberration generated due to the difference of cover thickness between optical disks of single layer and double layer, which does not produce deterioration of aberration due to misalignment with an objective lens, and which can stably carry out writing and/or reading.

Means for Solving the Problems

The present invention provides a liquid crystal lens element comprising a pair of opposing transparent electrodes and a liquid crystal layer sandwiched between these transparent electrodes, wherein a converging point of light transmitted through the liquid crystal layer is changed according to a magnitude of voltage applied to the liquid crystal layer;

the liquid crystal lens element being characterized in that the liquid crystal lens element comprises a Fresnel lens formed on a flat surface of one of the transparent substrates opposed to the other substrate, a first transparent electrode formed on a concave-convex shaped surface of the Fresnel lens, and a second transparent electrode formed on a flat surface of said other transparent substrate opposed to said one of the transparent substrate; according to a voltage V applied between the first transparent electrode and the second transparent electrode sandwiching the liquid crystal layer, substantial refractive index n(V) of the liquid crystal layer for linearly polarized incident light having a predetermined wavelength λ changes from a refractive index $n_1$ at a time of no voltage application to a sufficiently saturated refractive index $n_2$ ($n_1 \neq n_2$) which is not fluctuated by fluctuation of the applied voltage; the Fresnel lens is formed to have a thickness d satisfying a relation d≧0.75×λ/δn provided that the refractive index $n_s$ of the Fresnel lens is a value between the refractive indexes $n_1$ and $n_2$, and that the refractive index differences $|n_1-n_s|$ and $|n_2-n_s|$ between the Fresnel lens and the liquid crystal layer, whichever smaller, is designated as δn; and there present focal lengths corresponding to M levels (here, M is an integer of at least 3) of specific applied voltages among voltages V applied between the first transparent electrode and the second transparent electrode.

By this construction, a substantial refractive index n(V) of the liquid crystal layer changes according to an applied voltage V, and by forming the Fresnel lens so as to satisfy a relational formula d≧0.75×λ/δn, it is possible to generate a transmission wavefront corresponding to a concave lens or a convex lens respectively, or a transmission wavefront having no wavefront change. Here, a focal length of infinitely long is also considered as a focal length.

Further, the present invention provides an optical lens element, wherein the Fresnel lens is formed so that the refractive index $n_s$ of the Fresnel lens, $n_1$ and $n_2$ satisfy a relational formula $|n_1-n_s| \leq |n_2-n_s|$, and the thickness d of the Fresnel lens satisfies a relational formula:

$$(m-0.25) \times \lambda \leq |n_1-n_s| \times d \leq (m+0.25) \times \lambda \quad (2)$$

(wherein m=1, 2 or 3), and provided that a refractive index $n(V_k)$ of the liquid crystal layer satisfies the following relation at a time of applying the specific applied voltage $V_k$:

$$n(V_k) = n_1 + [(m-k) \times (n_s - n_1)]/m$$

(wherein k is an integer satisfying $-m \leq k \leq m$), the M is represented by 2m+1, and M types of focal lengths are present, which corresponds to M levels of applied voltages $V_k$.

By this construction, when the thickness d of the Fresnel lens satisfies the Formula (2), a multi focal length variable liquid crystal lens capable of switching transmission wavefront among at least three types, is realized. Namely, according to switching of applied voltage $V_k$, the multi focal length variable liquid crystal lens can switch its focal length among three types when m=1, five types when m=2 and seven types when m=3. As a result, although a conventional Fresnel lens (Patent Document 3) employing a blaze shaped substrate and a liquid crystal, can only switch the focal length between two lengths, and thus, its application is limited, but the liquid crystal lens of the present invention can be applied for wider range of applications.

Further, the present invention provides the liquid crystal lens element, wherein the Fresnel lens has a shape approximated by steps.

Since the liquid crystal fills convex portions of the concave-convex portion having a cross-sectional shape of a Fresnel lens or a Fresnel lens approximated by steps, the thickness of the liquid crystal layer can be thin while producing a power component corresponding to a large optical path difference. As a result, a high speed focal length switching is realized. In other words, it is possible to provide a liquid crystal lens element having no moving part and being small sized, which has a lens function of stably correcting spherical aberration containing a power component according to applied voltage.

Further, the present invention provides the liquid crystal lens element, wherein the Fresnel lens is made of a birefringent material, the extraordinary refractive index of the birefringent material corresponds to the refractive index $n_s$, and the ordinary refractive index of the birefringent material equals to the ordinary refractive index of the liquid crystal layer.

Further, the present invention provides the liquid crystal lens element, wherein the Fresnel lens is made of $SiO_xN_y$ (wherein 0≦x≦2, 0<y+1, and 0<x+y).

Further, the present invention provides an optical head device comprising a light source for emitting light of wavelength λ, an objective lens for converging light emitted from the light source on an information recording medium, a beam splitter for splitting light converged on the objecting lens and reflected by the optical recording medium, and a photodetector for detecting the split light; the optical head device being characterized by comprising the liquid crystal lens element, in an optical path between the light source and the objective lens.

By constructing an optical head device employing such a liquid crystal lens element, for single layer and double layer optical disks as optical recording mediums, it is possible to efficiently correct a spherical aberration containing a power component generated due to the difference of cover thickness or variation of the cover thickness in an optical disk. Further, since little deterioration of aberration occurs even in a case where an objective lens and a liquid crystal lens element are misaligned at a time of tracking, there is no need of mounting the liquid crystal lens element on an actuator together with the objective lens. As a result, limitation of the position of the liquid crystal lens element in the optical head device, is reduced, and convergence to an information recording plane is improved, and an optical head device capable of stably writing and/or reading is realized.

The present invention provides the optical head device, wherein the optical recording medium has a cover layer covering an information recording layer, and the optical head device carries out writing and/or reading to/from the optical recording mediums having different cover thicknesses.

Further, the present invention provides a method of using optical head device, which is a method of using an optical head device comprising a light source for emitting light of wavelength λ, an objective lens for converging light emitted from the light source on an information recording medium, a beam splitter for splitting light converged by the objective lens and reflected by the information recording medium, and a photodetector for detecting the split light; the method being characterized in that the liquid crystal lens element is disposed in an optical path between the light source and the objective lens, and a specific applied voltage $V_k$ among M voltages (wherein M is an integer of at least 3) is applied between the transparent electrodes of the liquid crystal lens element.

Further, the present invention provides a method of using optical head device, which is a method of using the optical head device for writing and/or reading to/from optical recording mediums having cover layers of different thicknesses each covering an information recording layer, wherein a specific applied voltage $V_k$ among M voltages (wherein M is an integer of at least 3) is applied between the transparent electrodes of the liquid crystal lens element employed in the optical head device.

EFFECTS OF THE INVENTION

According to the present invention, a multi focal length variable liquid crystal lens capable of switching at least three types of transmission wavefront according to an applied voltage, can be realized. Moreover, since convex portions of the concave-convex portion having a cross-sectional shape of Fresnel lens or a Fresnel lens approximated by steps, are filled with a liquid crystal, it is possible to reduce the thickness of the liquid crystal layer, while generating a power component corresponding to a large optical path difference. Accordingly, such a construction leads to high speed response and it is possible to provide a liquid crystal lens element which has no moving part and can be small sized and which has a lens function stably correcting a spherical aberration containing a power component according to an applied voltage.

Further, by constructing an optical head device employing such a liquid crystal lens element, it is possible to efficiently correct a spherical aberration containing a power component generated due to the difference of cover thicknesses between single layer and double layer optical disks or due to variation of a cover thickness in an optical disk. Further, since there occurs little deterioration of aberration even in a case where the objective lens and the liquid crystal lens element are misaligned at a time of tracking, an optical head device capable of stably writing and/or reading, is realized.

BRIEF EXPLANATION OF THE DRAWINGS

FIG. 4: A side view showing an effect of switching applied voltage to the liquid crystal lens element of the first embodiment, wherein FIG. 4(A) shows a diverging transmission wavefront at an applied voltage $V_{+1}$. FIG. 4(B) shows a transmission wavefront having no wavefront change at an applied voltage $V_0$. FIG. 4(C) shows a converging transmission wavefront at an applied voltage $V_{-1}$.

FIG. 7: An explanation view showing an effect of switching applied voltage to the liquid crystal lens element of the second embodiment, wherein FIG. 7(A) shows a diverging transmission wavefront at an applied voltage $V_{+2}$. FIG. 7(B) shows a diverging transmission wavefront at an applied voltage $V_{+1}$. FIG. 7(C) shows a transmission wavefront having no wavefront change at an applied voltage $V_0$. FIG. 7(D) shows a converging transmission wavefront at an applied voltage $V_{-1}$. FIG. 7(E) shows a converging transmission wavefront at an applied voltage $V_{-2}$.

EXPLANATION OF NUMERALS

Figure 1:
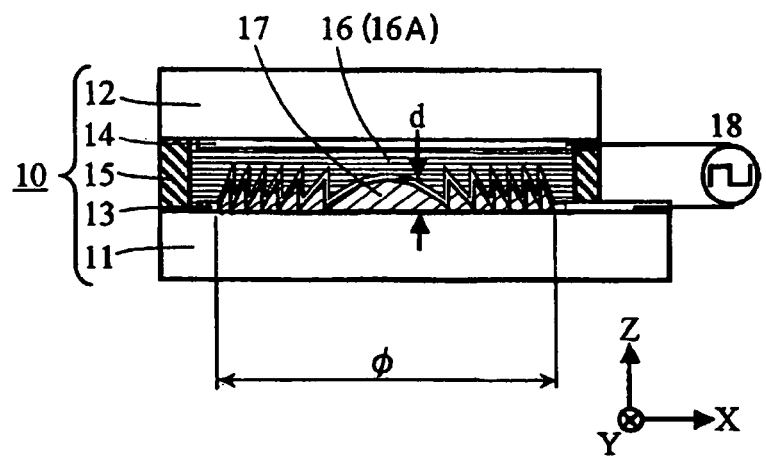
FIG. 1: A vertical cross-sectional view showing the construction of a liquid crystal lens element of a first embodiment according to the present invention.

10, 20, 30: liquid crystal lens element
11, 12, 12A, 12B: transparent substrate
13, 13A, 13B: first transparent electrode
14, 14A, 14B: second transparent electrode
15, 15A, 15B: seal
16: liquid crystal
16A, 16B, 16C, 16D: liquid crystal layer
17, 17A, 17B, 17C, 17D: concave-convex portion
18: AC power source
131, 141: electrode
40: optical head device
D: optical disk

BEST MODE FOR CARRYING OUT THE INVENTION

From now, embodiments of the present invention are described with reference to attached drawings.

First Embodiment

An example of the construction of the liquid crystal lens element 10 according to the first embodiment of the present invention, is described in detail with reference to a side view shown in FIG. 1 and a plan view shown in FIG. 2.

The liquid crystal lens element 10 of this embodiment comprises transparent substrates 11 and 12, transparent electrodes 13 and 14, a seal 15, a liquid crystal (liquid crystal layer) 16, a concave-convex portion 17 and an AC power source 18.

Among these, the concave-convex portion 17 has a shape of a Fresnel lens or a Fresnel lens approximated by steps, which is formed by employing a transparent material having a refractive index $n_s$, and has a rotational symmetry about an optical axis (Z axis) of incident light within a region of effective diameter $\phi$.

Then, an example of production process of the liquid crystal lens element 10, is described as follows.

First of all, on one of the flat surfaces (a top surface in FIG. 1) of the transparent substrate 11, a concave-convex portion 17 having a shape of Fresnel lens or a Fresnel lens approximated by steps, is formed with a transparent material of refractive index $n_s$. Further, on the surface of the concave-convex portion 17, a first transparent electrode 13 is formed.

Meanwhile, after a second transparent electrode 14 is formed on the transparent substrate 12, an adhesive agent in which a gap control material is mixed is patterned by printing to form a seal 15 on the transparent substrate 12, and the transparent substrate 12 and the above-mentioned transparent substrate 11 are laminated and press-bonded so as to have a predetermined gap between them, to form an empty cell. Then, from an injection port (not shown) provided at a part of the seal 15, a nematic type liquid crystal 16 having an ordinary refractive index $n_o$ and an extraordinary refractive index $n_e$ (here, $n_o \neq n_e$) is injected, and the injection port is sealed to seal the liquid crystal 16 in the cell to form a liquid crystal layer, to thereby obtain a liquid crystal lens element 10 of this embodiment. Further, in order to prevent short circuit between the first transparent electrode 13 and the second transparent electrode 14 due to interfusion of e.g. foreign matter in the liquid crystal layer, it is preferred to select the gap control material so that the shortest distance between the first transparent electrode 13 and the second transparent electrode 14 becomes at least 2 µm. Further, it is preferred to form a transparent insulator film (not shown) on the surface of the second transparent electrode 14 to have a film thickness about from 10 to 200 nm to prevent short circuit.

To the first and second transparent electrodes 13 and 14 of the liquid crystal lens element 10 in which at least concave portions of the concave-convex portion 17 are filled with the liquid crystal 16 thus obtained, an AC voltage of rectangular waves applied by using an AC power source 18, whereby the alignment of the molecules of the liquid crystal 16 is changed and substantial refractive index of the liquid crystal layer changes from $n_1$ to $n_2$ ($n_1 \neq n_2$). Here, the substantial refractive index of the liquid crystal layer comprising the liquid crystal 16 (this is referred to as liquid crystal layer 16A), means an average refractive index of the liquid crystal layer 16A sandwiched between the first transparent electrode 13 and the second transparent electrode 14 in a polarization direction of incident light, which corresponds to (optical path)÷(thickness of liquid crystal layer). As a result, the refractive index difference $\Delta n(V)$ for a specific linearly polarized incident light between the liquid crystal layer 16A and the concave-convex portion 17 changes according to the magnitude of applied voltage, whereby wavefront of transmission light trough the liquid crystal lens element 10 changes.

Here, the concave-convex portion 17 made of a transparent material, may be made of an organic material such as a UV curable resin, a thermosetting resin or a photo-sensitive resin, or an inorganic material such as $SiO_2$, $Al_2O_3$ or $SiO_xN_y$ (here, x and y show element ratio between O and N and satisfy $0 \leq x \leq 2$, $0 \leq y \leq 1$ and $0 < x+y$). Further, the transparent material may be a uniform refractive index material or a birefringent material. The point is, the transparent material may be any material so long as it has a refractive index $n_s$ which is between $n_1$ and $n_2$ and satisfies a relation $|n_1-n_s| \leq |n_2-n_s|$ in a polarization direction of incident light in which the refractive index of the liquid crystal layer 16A changes according to an applied voltage.

Here, the concave-convex portion 17 may be formed by forming a transparent material layer of a predetermined film thickness on a flat surface of the transparent substrate 11 and fabricating the layer into the concave-convex shape by photolithography or reactive ion etching, or else, the concave-convex portion 17 may be formed by transferring the shape of the concave-convex portion into the transparent material layer by using a metal mold.

Further, in order to obtain a large change of substantial refractive index of the liquid crystal layer 16A in response to applied voltage, alignment direction of molecules of the liquid crystal layer 16A filling concave portions of the concave-convex portion 17, is preferably uniform on surfaces of the transparent electrodes 13 and 14.

Figure 2:
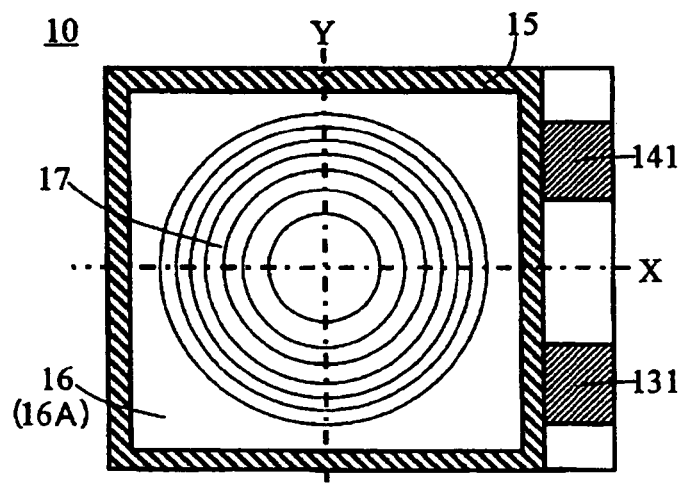
FIG. 2: A lateral cross-sectional view showing the construction of the liquid crystal lens element shown in FIG. 1.

Here, with respect to the alignment direction of nematic liquid crystal molecules of the liquid crystal layer 16A, for example, there are three types as follows.

i) In a case where a dielectric anisotropy $\Delta \epsilon$ as a difference between the relative dielectric constant in an extraordinary refractive index direction of the liquid crystal 16 and the relative dielectric constant in an ordinary refractive index direction, is positive, on surfaces of the first and second transparent electrodes 13 and 14 in FIG. 1, an alignment film (not shown) made of e.g. polyimide is coated so that the alignment direction of the liquid crystal molecules is approximately in parallel with one surface (this is referred to as substrate surface) of the transparent substrates 11 and 12, and the film is cured and subjected to a rubbing treatment in a X axis direction. By this process, a homogeneous alignment is formed, in which the alignment direction of liquid crystal molecules (namely, a direction of extraordinary refractive index $n_e$) is uniformly in X axis direction. Here, besides the rubbing treatment of polyimide, the liquid crystal molecules may be aligned uniformly by employing an oblique vapor deposition film of silicon oxide or an optical alignment film. Here, by applying an AC voltage V between the first and the second transparent electrodes 13 and 14, substantial refractive index $n(V)$ of the liquid crystal layer 16A changes from $n_1(=n_e)$ to $n_2(=n_o)$ for linearly polarized incident light having a polarization plane in X axis direction.

According to this construction, since a large change of substantial refractive index of the liquid crystal layer 16A can be obtained by low voltage, it is possible to make the maximum depth d of the concave-convex portion 17 constituting a transparent concave-convex electrode substrate surface, a relatively small value. As a result, it becomes possible to shorten the fabrication process of the concave-convex portion 17 and to reduce the thickness of the liquid crystal layer 16A, which leads to high speed response.

ii) On a surface of the first transparent electrode 13, an alignment film (not shown) such as polyimide which makes alignment direction of liquid crystal molecules substantially perpendicular to the substrate surface, is applied and cured. Meanwhile, on a flat surface of the second transparent electrode 14, an alignment film (not shown) of e.g. polyimide which makes alignment direction of liquid crystal molecules parallel with the substrate surface, is applied, cured and subjected to a rubbing treatment in X axis direction. As a result, the alignment direction of liquid crystal molecules becomes uniformly substantially perpendicular to the substrate surface of the transparent electrode 13 of the concave-convex portion 17, and the direction becomes substantially in parallel with the substrate surface on the second transparent electrode 14, whereby a hybrid alignment is formed. In this case, uniform liquid crystal alignment is easily obtained since no alignment treatment is necessary for the concave-convex portion 17. Here, by applying an AC voltage V between the first and second transparent electrodes 13 and 14, substantial refractive index n(V) of the liquid crystal layer changes from $n_1(=[n_e+n_o]/2)$ to $n_2(=n_o)$ for linearly polarized incident light having a polarization plane in X axis direction.

According to this construction, since the alignment of the liquid crystal layer 16A is regulated by the alignment film on the substrate surface of the second transparent electrode 14 subjected to an alignment treatment, alignment direction of the liquid crystal layer 16A becomes stable even without alignment treatment to the alignment film on a substrate surface of the first transparent electrode 13. As a result, it becomes possible to reduce deterioration of efficiency of transmission light due to defective alignment of the concave-convex substrate surface.

iii) A liquid crystal having a negative dielectric anisotropy $\Delta\epsilon$ in which the alignment of the liquid crystal is uniformly perpendicular to an electric field in response to voltage application, is employed, and an alignment film such as polyimide aligning liquid crystal molecules substantially perpendicularly to the substrate surface, is coated on the surfaces of the first and second transparent electrodes 13 and 14, and cured. Further, only the alignment film on the second transparent electrode 14 is subjected to a rubbing treatment in X axis direction. As a result, a perpendicular alignment is formed in which the alignment direction of liquid crystal molecules is uniformly substantially perpendicular to substrate surfaces of the transparent electrodes 13 and 14. Since there is no need of applying alignment treatment on the surface of the concave-convex portion 17, a uniform liquid crystal alignment is easily obtained. Here, by applying a voltage V between the transparent electrodes 13 and 14, substantial refractive index n(V) of the liquid crystal layer 16A for linearly polarized incident light having a polarization plane in X axis direction, changes from $n_1(=n_o)$ to $n_2(=n_e)$.

According to this construction, since a large change of substantial refractive index of the liquid crystal layer 16A can be obtained by low voltage, it is possible to make the maximum depth d of the concave-convex portion 17 constituting the Fresnel lens, relatively small value. As a result, it becomes possible to shorten the fabrication process of the concave-convex portion 17 and to reduce the thickness of the liquid crystal layer 16A, which leads to high speed response. Further, since the alignment of the liquid crystal layer 16A is regulated by the alignment film on the second transparent electrode 14 subjected to an alignment treatment, alignment direction of the liquid crystal layer 16A becomes stable even without alignment treatment to the alignment film on the first transparent electrode 13. As a result, it becomes possible to reduce deterioration of efficiency of transmission light due to defective alignment of the substrate surface.

Here, in order to apply a voltage to the second transparent electrode 14 via an electrode 141 formed on the transparent substrate 11 side, conductive metal particles are mixed in a seal 15 in advance and seal-press-bonding is carried out, whereby conductivity is developed in the direction of seal thickness, and the second transparent electrode 14 and the electrode 141 are conducted to each other. The electrode 131 connected to the first transparent electrode 13 and the electrode 141 connected to the second transparent electrode 14 are connected to an AC power source 18, whereby a voltage can be applied to the liquid crystal layer 16A.

Then, a cross-sectional shape of the concave-convex portion 17 which is a Fresnel lens shape or a Fresnel lens shape approximated by steps, is described as follows.

In order to employ the liquid crystal lens element 10 of the present invention in an optical head device, to produce a transmission wavefront for correcting a spherical aberration generated due to the difference of the cover thickness of optical disks, and to generate a transmission wavefront containing a positive or a negative power component added to prevent generation of aberration due to misalignment with an objective lens, in a transmission wavefront in a plane wave incident into the liquid crystal lens element 10, an optical path difference OPD of a light beam passing through a position a radius r away from a light beam passing through an optical axis center (coordinate origin: x=y=0), is represented by the following power series shown in formula 3:

$$OPD(r)=a_1r^2+a_2r^4+a_3r^6+a_4r^8+ \quad (3)$$

wherein $r^2=x^2+y^2$ $a_1, a_2, \ldots$, constant (refer to Table 1 and Table 2 to be described later)

Figure 3:
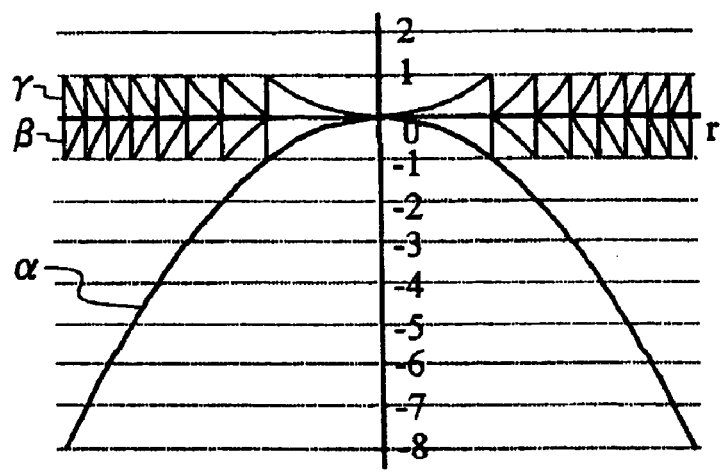
FIG. 3: A graph showing the optical path difference of a transmission wavefront generated by the liquid crystal lens according to the first embodiment, wherein a is a graph showing the optical path difference by a unit of wavelength $\lambda$ in relation to a radial position r shown in a horizontal axis. $\beta$ is a graph showing an optical path difference of at least $-\lambda$ and at most 0 obtained by subtracting an integer times of wavelength $\lambda$ from $\alpha$. $\gamma$ is a graph showing an optical path difference plane-symmetrical to $\beta$ about a plane of zero optical path difference.

Here, a specific example of the curve of Formula (3) is designated by a symbol $\alpha$ in FIG. 3. Here, the lateral axis represents a radial position r, and the vertical axis represents the optical path difference OPD by a unit of wavelength $\lambda$ of incident light, and a graph of $\alpha$ shows a cross-section including the central axis (r=0) of Formula (3).

In the liquid crystal lens element 10, a transmission wavefront having an optical path difference of an integer times of $\lambda$ from incident light of wavelength $\lambda$, can be regarded as equivalent. Accordingly, a graph $\beta$ showing an optical path difference obtained by slicing the graph (optical path difference) shown by $\alpha$ of FIG. 3 at a wavelength $\lambda$ interval and projecting into a plane of zero optical path difference, is substantially equivalent to the graph $\alpha$. Optical path difference shown in graph $\beta$, is all within $\lambda$ (within a range of from $-\lambda$ to zero in the figure) and it has a Fresnel lens shape. This shape becomes the shape of the concave-convex portion 17 in the liquid crystal lens element 10 shown in FIG. 1.

Then, when a voltage V is applied to the transparent electrodes 13 and 14, provided that a substantial refractive index of the liquid crystal layer 16A for extraordinarily polarized light is designated as n(V), the refractive index difference between the liquid crystal 16 and the concave-convex portion 17 is $\Delta n(V)=n(V)-n_s$. Here, the symbol $n_s$ designates the refractive index of the concave-convex portion 17 made of a transparent material as described above.

For example, it is possible to produce an optical path difference of a transmission wavefront corresponding to the graph $\beta$ of FIG. 3 at an applied voltage $V_{+1}$, by fabricating the concave-convex portion 17 shown in FIG. 1 to have a depth d satisfying the following formula:

$$d=\lambda/|\Delta n(V_{+1})| \quad (4)$$

wherein $\lambda$: wavelength of incident light $\Delta n(V_{+1})=n(V_{+1})-n_s=n_1-n_s$ Namely, this corresponds to a case of $n_1-n_s>0$, and corresponds to the depth in the case of m=1 in Formula (2).

Here, the refractive index difference $\Delta n(V)$ changes by changing an applied voltage V. For example, i) at an applied voltage $V_0$ satisfying $\Delta n(V_0)=0$, transmission wavefront through the liquid crystal lens element 10 does not change. Further, ii) at an applied voltage $V_{-1}$ satisfying $\Delta n(V_{-1})=-\Delta n(V_{+1})$, a transmission wavefront having an optical path difference shown by graph $\gamma$ of FIG. 3, is generated. This corresponds to a transmission wavefront having an optical path difference symmetry with respect to graph $\beta$ of FIG. 3 about a plane of zero optical path difference.

Here, the concave-convex portion 17 is fabricated to have a cross-sectional shape of a Fresnel lens or a Fresnel lens approximated by steps, so as to have spatial distributions of optical path difference corresponding to graph β and graph γ of FIG. 3 when the substantial refractive index of the liquid crystal layer 16A is $n(V_{+1})$ and $n(V_{-1})$ respectively. Further, as shown in FIG. 1, by making central portion of the concave-convex portion 17 a convex shape, average layer thickness of the liquid layer 16A can be reduced. This leads to high speed response and reduces the amount of liquid crystal material to be used, such being preferred.

In the liquid crystal lens element 10 of this embodiment, if the transparent material forming the concave-convex portion 17 is selected so that its refractive index $n_s$ is between $n_1$ and $n_2$ and satisfies a formula $|n_1-n_s| \leq |n_2-n_s|$, voltage values $V_{+1} < V_0 < V_{-1}$ are always present which satisfy:

$$\Delta n(V_0)=0 \text{ and}$$

$$\Delta n(V_{-1})=-\Delta n(V_{+1}).$$

Here, the substantial refractive index n(V) of the liquid crystal layer changes depending on a temperature and it decreases as the temperature increases. Accordingly, when the operation temperature range of the liquid crystal lens element changes from −10° C. to 80° C., the depth d of the concave-convex portion 17 preferably satisfies Formula (4) at the high temperature region, namely, at 80° C. Namely, if a formula $d=0.75\times\lambda/|\Delta n(V_{+1})|$ is satisfied at a room temperature, voltage values $V_{+1}<V_0<V_{-1}$ are always present at the operation temperature range.

Accordingly, by switching the applied voltage among voltages $V_{+1}$, $V_0$ and $V_{-1}$ by using the AC power source 18, it becomes possible to selectively switch the transmission wavefront among three types.

Here, in order to efficiently produce transmission wavefronts corresponding to graph β and graph γ at applied voltages $V_{+1}$ and $V_{-1}$ respectively, it is preferred that the concave-convex portion 17 has a Fresnel shape or a Fresnel shape approximated by a step shape of N steps, and that the maximum depth d of the concave-convex portion satisfies the following formula:

$$d=[(N-1)/N]\times\lambda/|\Delta n(V_{+1})|.$$

Here, in order to make generation efficiency of the transmission wavefront to be at least 70%, N is preferably at least 4. Namely, it is preferred that d satisfies the following formula:

$$0.75\times\lambda \leq |n_1-n_2|\times d \leq \lambda.$$

This corresponds to a case of m=1 in Formula (2).

For the same reason, it is preferred that d satisfies Formula (2) also in cases of m=2 and 3.

Figure 4:
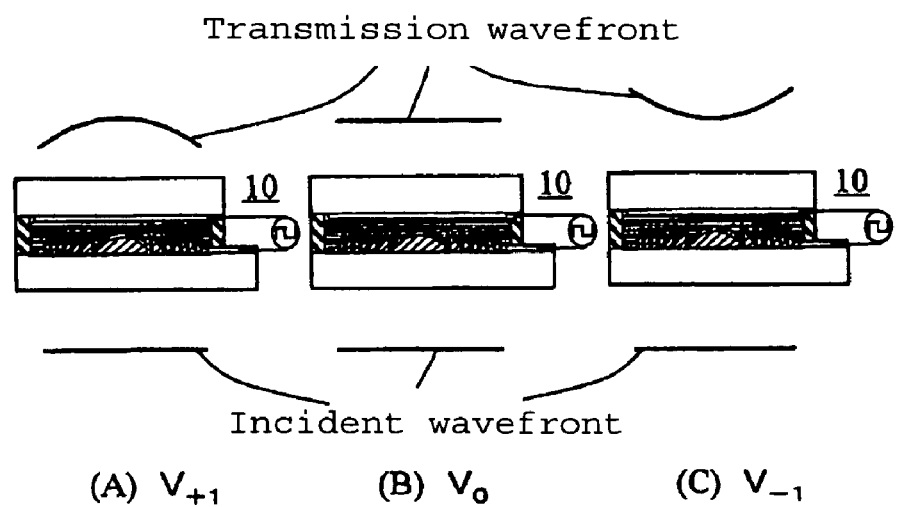

Here, in a case where $\Delta n(V_{+1})=n_1-n_s>0$, plane waves of linearly polarized light of wavelength λ incident into the liquid crystal lens 10 at applied voltages $V_{+1}$, $V_0$ and $V_{-1}$, are transformed into transmission wavefronts shown in FIG. 4(A), FIG. 4(B) and FIG. 4(C) respectively, to be output. Namely, a lens function is obtained, which corresponds to negative power, no power and positive power according to the magnitude of applied voltage to the first and second transparent electrodes 13 and 14.

Here, in a case where $\Delta n(V_{+1})<0$, the plane waves are transformed into transmission wavefronts corresponding to a positive power and a negative power corresponding to FIG. 4(C) and FIG. 4(A) at $V_{+1}$ and $V_{-1}$ respectively, to be output.

Further, in this embodiment, element structure and operation principle are described with respect to a case of the liquid crystal lens element 10 generating an optical path difference OPD represented by Formula (3) that is symmetry about an axis, but it is also possible to produce a liquid crystal element generating an optical path difference OPD corresponding to correction of a coma aberration or an astigmatism asymmetric about an axis other than aberrations represented by Formula (3), by fabricating the concave-convex portion and filling the concave portions with a liquid crystal in the same principle.

In this embodiment, for linearly polarized incident light for which the refractive index n(V) of the liquid crystal layer 16 changes from $n_1$ to $n_2$ according to an applied voltage V, the concave-convex portion 17 is made of a transparent material having a refractive index $n_s$. The transparent material used for the concave-convex portion 17, may be a uniform refractive index material, or may be a birefringent material such as a polymer liquid crystal in which alignment direction of molecules is uniformly in one direction in a substrate plane. In a case of employing a birefringent material, it is preferred to make its extraordinary refractive index to be $n_s$ and make its ordinary refractive index equal to the ordinary refractive index $n_o$ of the liquid crystal, and to make the direction of the extraordinary refractive index of the birefringent material equal to the alignment direction of liquid crystal molecules of the liquid crystal layer 16. By such a construction, ordinary refractive indexes of the liquid crystal and the birefringent material are equal regardless of the magnitude of applied voltage for ordinarily polarized incident light, whereby transmission wavefront does not change.

Here, in this example, a construction is shown, in which the first transparent electrode 13 and the second transparent electrode 14 that are one piece electrodes, are used for applying an AC voltage to the liquid crystal layer. Besides this construction, for example, the construction may be such that at least one electrode of the first transparent electrode 13 and the second transparent electrode 14, is spatially divided into segments so that different AC voltages can be applied to respective segments. Further, the spatially divided transparent electrodes may be made of resister films having a predetermined resistance, and at least two power supply points are provided to form an applied voltage distribution in a radial direction, so that a voltage applied to the liquid crystal has a slope distribution in the radial direction. By forming such a segment electrode or a resistance film electrode construction, it is possible to produce further various spatial distributions of optical path difference OPD. As a result, it is possible to produce transmission wavefronts other than those shown in FIG. 4(A), FIG. 4(B) and FIG. 4(C).

Further, e.g. a phase plate, a diffraction grating, a polarizing hologram beam splitter or a correction surface for predetermined constant aberration, may be integrally formed with the liquid crystal lens element 10. As a result, in a case of employing the liquid crystal lens element 10 in e.g. an optical head device, the number of components can be reduced and such a construction leads to downsizing of the device.

Second Embodiment

An example of the construction of a liquid crystal lens element 20 according to the second embodiment of the present invention, is described in detail with reference to a side view shown in FIG. 5. Here, in this embodiment, same portions as those of the first embodiment are designated as the same reference numerals to avoid duplication of explanation.

The liquid crystal lens element 20 of this embodiment is different from the liquid crystal lens element 10 of the first embodiment in that the maximum depth d of a concave-convex portion 17B corresponds to the depth in a case of m=2 of the above-mentioned Formula (2). Accordingly, the distribution of the depth of the liquid crystal layer 16B is also different.

Figure 6:
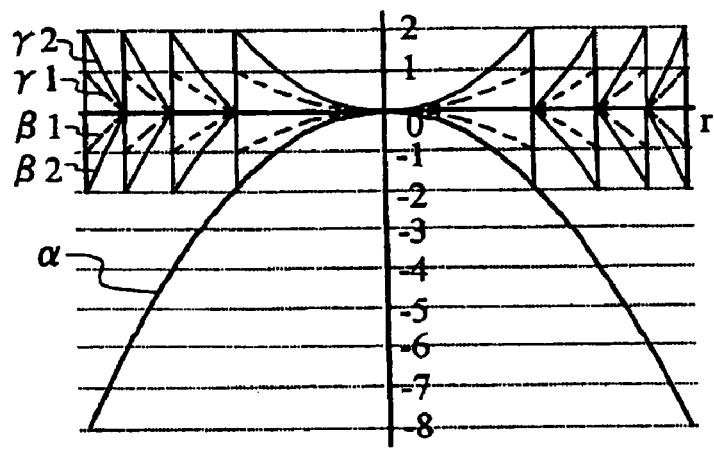
FIG. 6: A graph showing the optical path difference of a transmission wavefront generated by the liquid crystal lens according to the second embodiment, wherein $\alpha$ is a graph showing the optical path difference by a unit of wavelength $\lambda$ in relation to a radial position r shown in a horizontal axis. $\beta2$ is a graph showing an optical path difference of at least $-2\lambda$ and at most zero obtained by subtracting an integer times of wavelengths $2\lambda$ from $\alpha$. $\beta1$ is a graph showing an optical path difference that is a half of the optical path difference of $\beta2$. $\gamma1$ is a graph showing an optical path difference plane-symmetrical to $\beta1$ about a plane of zero optical path difference. $\gamma2$ is a graph showing an optical path difference plane-symmetrical to $\beta2$ about a plane of zero optical path difference.

The concave-convex portion 17B of the liquid crystal lens element 20 according to this embodiment, is described as follows. Here, α of FIG. 6 is, in the same manner as α of FIG. 3, a graph showing an optical path difference OPD represented by Formula (3). Further, an optical path difference obtained by slicing α of FIG. 6 at an interval of twice of wavelength λ (namely, 2λ) and projecting into a plane of optical path difference zero, is shown as graph β2 of FIG. 6. The graph β2 is substantially equivalent to the graph α and the optical path difference shown in graph β2 is entirely within 2λ (in the Figure, within a range of from −2λ to zero), and β2 has a cross-sectional shape of Fresnel lens.

Figure 5:
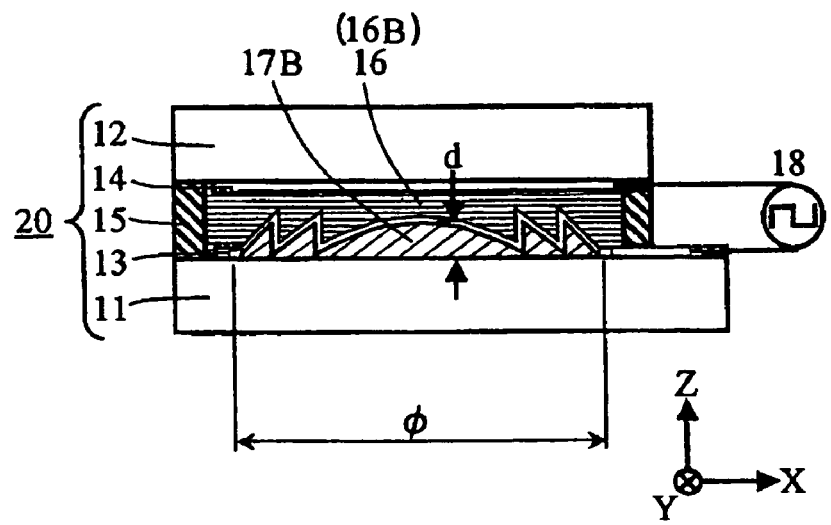
FIG. 5: A vertical cross-sectional view showing a construction of a liquid crystal lens element of the second embodiment according to the present invention.

It is possible to produce an optical path difference of a transmission wavefront corresponding to the graph β2 of FIG. 6 at an applied voltage $V_{+2}$, by fabricating the concave-convex portion 17B shown in FIG. 5 to have a depth d satisfying the following formula:

$$d=2\lambda/|\Delta n(V_{+2})| \qquad (5)$$

wherein λ: wavelength of incident light $$\Delta n(V_{+2})=n(V_{+2})-n_s=n_1-n_s$$

This is a case of $n_1-n_s>0$, and the depth d corresponds to a depth in a case of m=2 in Formula (2).

Here, the refractive index difference Δn(V) is changed by changing the applied voltage V. For example:

i) at an applied voltage $V_0$ satisfying $\Delta n(V_0)=0$, a transmission wavefront of the liquid crystal lens element 20 does not change. Further, ii) at an applied voltage $V_{+1}$ satisfying $\Delta n(V_{+1})=\Delta n(V_{+2})/2$, a transmission wavefront having an optical path difference shown by graph β1 of FIG. 6, is generated. This corresponds to a transmission wavefront having a half of the optical path difference shown by graph β2 with respect to a plane of zero optical path difference, and also corresponds to a transmission wavefront having a half of the optical path difference of graph α. Further, the optical path difference shown by graph β1 is entirely within λ (in the Figure, within a range of from −λ to zero).

iii) At an applied voltage $V_{-1}$ satisfying $\Delta n(V_{-1})=-\Delta n(V_{+1})$, a transmission wavefront having an optical path difference shown by graph γ1 is generated. This corresponds to a transmission wavefront having an optical path difference symmetry with respect to graph β1 about a plane of zero optical path difference.

iv) At an applied voltage $V_{-2}$ satisfying $\Delta n(V_{-2})=-\Delta n(V_{+2})$, a transmission wavefront having an optical path difference shown by graph γ2 is generated. This corresponds to a transmission wavefront having an optical path difference symmetry with respect to graph β2 about a plane of zero optical path difference, and also corresponds to a transmission wavefront having twice of the optical path difference shown by graph γ1.

The concave-convex portion 17B is fabricated to have a cross-sectional shape of Fresnel lens or a Fresnel lens approximated by steps, so as to produce optical path difference spatial distributions corresponding to graph β2 and graph γ2 of FIG. 6 when the substantial refractive index of the liquid crystal layer 16B is $n(V_{+2})$ and $n(V_{-2})$ respectively.

In the liquid crystal lens element 20 of this embodiment, when the uniform refractive index transparent material forming the concave-convex portion 17B is selected so that the refractive index $n_s$ is between $n_1$ and $n_2$ and satisfies a relational formula $|n_1-n_s|\leq|n_2-n_s|$, voltage values $V_{+2}<V_{+1}<V_0<V_{-1}<V_{-2}$ are always present, which satisfy the following formula:

$$\Delta n(V_0)=0,$$

$$\Delta n(V_{-1})=-\Delta n(V_{+1}) \text{ and}$$

$$\Delta n(V_{-2})=-\Delta n(V_{+2}).$$

Accordingly, by switching an applied voltage among $V_{+2}$, $V_{+1}$, $V_0$, $V_{-1}$ and $V_{-2}$ by using an AC power source 18, it becomes possible to selectively switch transmission wavefront among five types.

Here, in order to efficiently produce transmission wavefronts corresponding to graph β2, β1, γ1 and γ2 at applied voltages $V_{+2}$, $V_{+1}$, $V_{-1}$ and $V_{-2}$ respectively, it is preferred that the concave-convex portion 17B has a Fresnel lens shape and the maximum depth d of the concave-convex portion 17B satisfies Formula (5).

Further, besides this embodiment, for example, in a case where the Fresnel lens shape of the concave-convex portion 17 is approximated by steps of N levels having (N−1) steps of equal step heights, maximum depth d of the concave-convex portion 17 preferably satisfies the following formula:

$$d=[(N-1)/N]\times 2\lambda/|\Delta n(V_{+2})|.$$

Here, in order to make the efficiency of the generated transmission wavefront to be at least 70%, N is preferably at least 8. Namely, the maximum depth d preferably satisfies a formula:

$$1.75\times\lambda\leq|n_1-n_s|\times d\leq 2\times\lambda.$$

This corresponds to a case of m=2 in Formula (2).

Here, in a case where $\Delta n(V_{+2})=n_1-n_s>0$, plane waves each having a linear polarization of wavelength λ incident into the liquid crystal lens element 20 at applied voltages $V_{+2}$, $V_{+1}$, $V_0$, $V_{-1}$ and $V_{-2}$, are transformed into transmission wavefronts shown in FIG. 7(A), FIG. 7(B), FIG. 7(C), FIG. 7(D) and FIG. 7(E) respectively, to be output. Namely, a lens function is obtained which corresponds to two types of negative powers, no power, and two types of positive powers in response to applied voltage to the transparent electrodes 13 and 14.

Here, in a case of $\Delta n(V_{+2})<0$, the plane waves are transformed into transmission wavefronts corresponding to positive powers corresponding to FIG. 7(E) and FIG. 7(D) at $V_{+2}$ and $V_{+1}$ respectively, and the plane waves are transformed into transmission wavefronts corresponding to negative powers corresponding to FIG. 7(A) and FIG. 7(B) at $V_{-2}$ and $V_{-1}$ respectively, to be output.

As described above, in this embodiment, an embodiment of liquid crystal lens element 20 producing β2 being an optical path difference OPD produced by slicing an optical path difference OPD shown by graph a of FIG. 6 corresponding to m=2 in Formula (2), at an interval of twice of wavelength λ. However, the construction of the liquid crystal lens element may be one corresponding to m=3 in Formula (2). In this case, the transmission wavefront becomes one corresponding to an optical path difference OPD produced by slicing a of FIG. 3 at an interval of three times of wavelength of λ.

Third Embodiment

Then, the liquid crystal lens element 30 according to the third embodiment of the present invention, is described with reference to FIG. 8. Here, in this embodiment, portions common with those of the first embodiment, are designated by the same reference numerals to avoid duplication of explanation.

The liquid crystal lens element 30 of this embodiment comprises a first liquid crystal lens element 10A, a second lens element 10B and an AC power source 18 for applying AC voltage to these elements. The combination of the first and second liquid crystal lens elements 10A and 10B, has a construction that two liquid crystal lens elements 10 according to the first embodiment are laminated above and below so that their concave-convex portions 17 are opposed to each other (here, a transparent substrate 11 is shared).

Here, the first (the second) liquid crystal lens element 10A (10B) comprises a transparent substrate 11 on which a second transparent electrode 14A (14B) is formed, a transparent substrate 12A (12B) on which a concave-convex portion 17C (17D) is formed and a first transparent electrode 13A (13B) is formed thereon, and a liquid crystal 16 sealed in a gap between these transparent substrates.

Then, production process of this embodiment is described.

First of all, on flat surfaces of the transparent substrates 12A and 12B, concave-convex portions 17C and 17D, each having a Fresnel lens or a Fresnel lens shape approximated by steps, are formed respectively by using a transparent material of refractive index $n_s$. These concave-convex portions 17C and 17D are fabricated to have the same concave-convex shape having a rotational symmetry about an optical axis (Z axis) of incident light. Further, on surfaces of the concave-convex portions 17C and 17D, first transparent electrodes 13A and 13B are formed respectively. Meanwhile, on both surfaces on the transparent substrate 11, second transparent electrodes 14A and 14B are formed respectively.

Then, on the transparent substrates 12A and 12B, seals 15A and 15B are formed by patterning an adhesive agent in which a gap control material is mixed, by printing. Then, the transparent substrates 12A and 12B and the transparent substrate 11 are laminated together and press-bonded to form an empty cell. Thereafter, from an injection port (not shown) provided a part of the seal, a liquid crystal 16 is injected, and then, the injection port is sealed to seal the liquid crystal 16 in the cell, to form the liquid crystal layers 16C and 16D, to thereby form the liquid crystal lens element 30. Further, the first transparent electrodes 13A and 13B are conducted to form a common electrode, and the second transparent electrodes 14A and 14B are conducted to form another common electrode.

In the liquid crystal lens element 30 thus produced, an AC voltage of rectangular wave is applied between the common electrodes by the AC power source 18. Accordingly, alignments of molecules in the liquid crystal layers 16C and 16D are changed according to the magnitude of the applied voltage V, and substantial refractive indexes of the liquid crystal layers 16C and 16D change from $n_1$ to $n_2$. As a result, the refractive index differences $\Delta n(V)$ from the liquid crystal layers 16C and 16D to the concave-convex portions 17A and 17B respectively, change, and accordingly, wavefront of transmission light with respect to that of the incident light changes.

Figure 8:
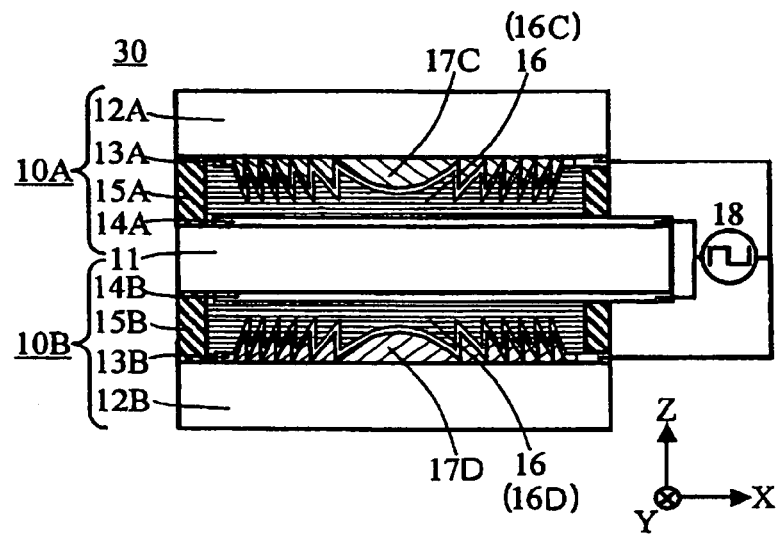
FIG. 8: A vertical cross-sectional view showing the construction of a liquid crystal lens element of a third embodiment of the present invention, in which two liquid crystal lens elements are laminated so that their alignment directions of liquid crystal molecules are perpendicular to each other.

The first and second liquid crystal lens elements 10A and 10B shown in FIG. 8 are the same as the liquid crystal lens 10 shown in FIG. 1 in terms of construction and functions, but they are different in that alignment directions of liquid crystal molecules of the liquid crystal layer 16C and the liquid crystal layer 16D, in terms of components in XY plane, are perpendicular to each other at a time of no voltage application or at a time of voltage application. As a result, by using the liquid crystal lens element of this embodiment, for example, a lens function is obtained in which negative power, no power and positive power shown in FIG. 4(A), FIG. 4(B) and FIG. 4(C) are obtained according to applied voltage regardless of polarization state of incident light.

Here, at an applied voltage $V_0$ providing $\Delta n(V_0) = 0$, for linearly polarized light component of incident light for which the refractive indexes of the liquid crystal layers 16C and 16D change according to the magnitude of applied voltage, transmission wavefront through the first and second liquid crystal lens elements 10A and 10B does is not change. On the other hand, for linearly polarized light component of the incident light in a polarization direction perpendicular to the above light component, the refractive indexes of the liquid crystal layers 16C and 16D becomes an ordinary refractive index $n_o$ regardless of the magnitude of applied voltage. Accordingly, to a transmission wavefront through the first and second liquid crystal lens element 10A and 10B, a predetermined change occurs according to the difference between the ordinary refractive index $n_0$ of the liquid crystal 16 and the ordinary refractive index of the material of the concave-convex portions 17C and 17D.

Particularly, in a case where the concave-convex portions 17C and 17D are made of a material of a uniform refractive index $n_s$, a predetermined wavefront change corresponding to the refractive index difference $(n_o - n_s)$ occurs. Since the first and second liquid crystal lens elements 10A and 10B have liquid crystal layers 16C and 16D respectively and alignment directions of their liquid crystal molecules, in terms of components in XY plane, are perpendicular to each other, this predetermined change of transmission wavefront occurs regardless of polarization state of incident light.

In order to cancel the predetermined change of transmission wavefront occurring at the applied voltage $V_0$, it is preferred to form a correction surface on a surface of any one of the transparent substrates 12A and 12B. Or else, by fabricating the concave-convex portions 17C and 17D employing a birefringent material such as a polymer liquid crystal having an ordinary refractive index equal to the ordinary refractive index of the liquid crystal layers 16C and 16D, directions of ordinary refractive index of these portions can be aligned to the directions of the ordinary refractive index of the liquid crystal layers 16C and 16D respectively. As a result, it is possible to make the liquid crystal lens element 20 so that no change occurs to a transmission wavefront at the applied voltage $V_0$.

Fourth Embodiment

Then, an optical head device 40 for writing and/or reading to/from a DVD optical disk, employing the liquid crystal lens element 10 (refer to FIG. 1) according to the first embodiment of the present invention, is described with reference to FIG. 9.

The optical head device 40 of this embodiment comprises a laser diode 1 as a light source of wavelength $\lambda (=660 \text{ nm})$ for DVD, a diffraction grating 2, a beam splitter 3, a collimator lens 4, an objective lens 5 and a photodetector 6 and further, a phase plate 7 and the liquid crystal lens element 10 disposed on an optical path between the collimator lens 4 and the objective lens 5. Here, if the phase plate 7 is integrally formed with the liquid crystal lens element 10, number of components can be reduced, such being preferred.

Figure 9:
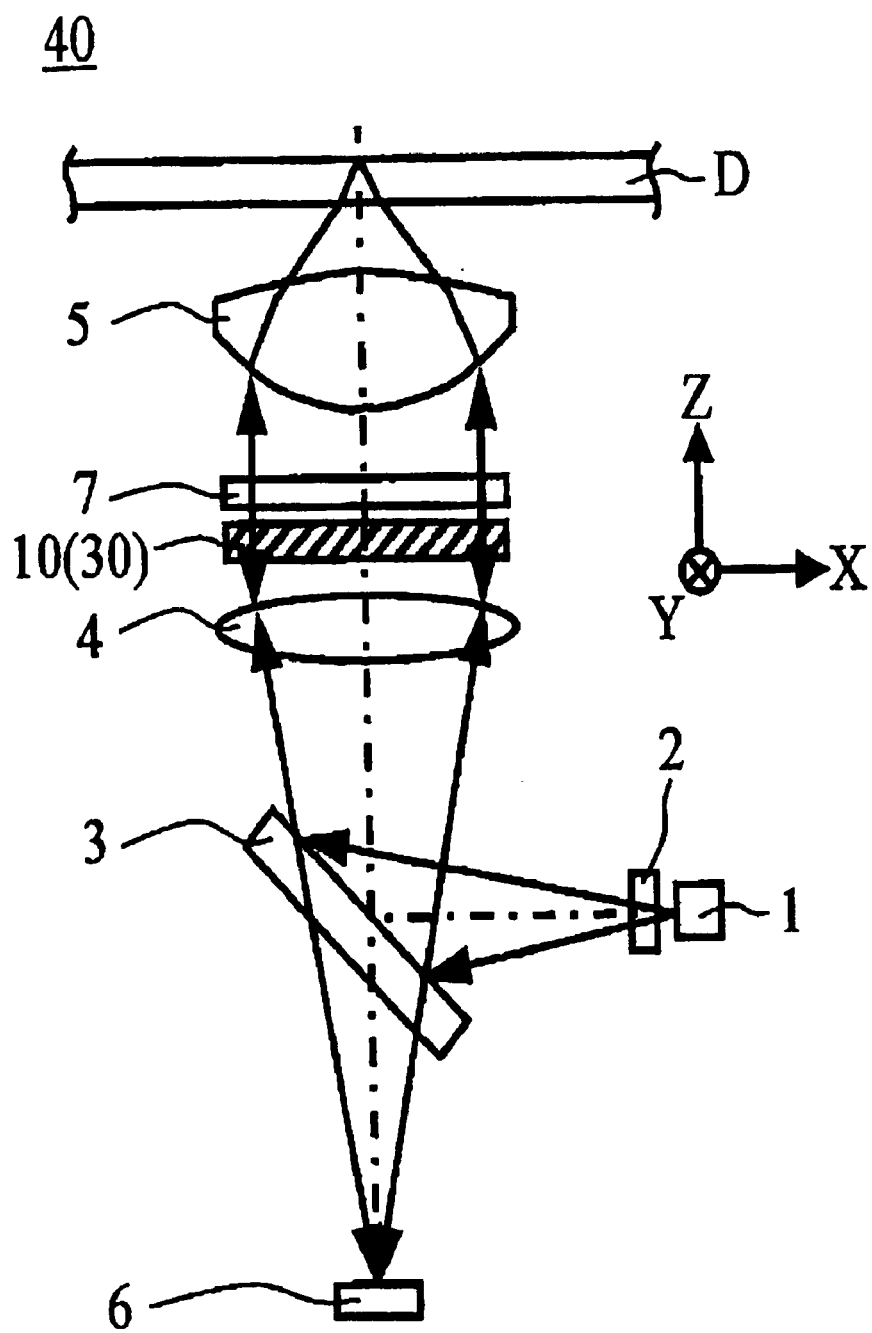
FIG. 9: A construction view showing an optical head device of a forth embodiment, employing the liquid crystal lens element of the present invention.

Further, in this FIG. 9, an example of the construction in which the liquid crystal lens element 10 is disposed in the optical path between the collimator lens 4 and the objective lens S, but the liquid crystal lens element 10 may be disposed in an optical path between the laser diode 1 and the objective lens 5.

Then, functions of this embodiment are described.

Linearly polarized emission light of wavelength $\lambda$ emitted from the laser diode 1 and having a polarization plane in a document face of FIG. 9, generates 3 beams for tracking by the diffraction grating 2. Then, the 3 beams are reflected by the beam splitter 3, and converted into parallel light beams by the collimator lens 54 and incident into the liquid crystal lens element 10. Then, light beams transmitted through the liquid crystal lens element 10 are each transformed into circularly polarized light by the phase plate 7 corresponding to a quarter wave plate for a wavelength $\lambda$, and converged on an information recording layer of a DVD optical disk by the objective lens 5.

Here, the objective lens 5 is movable in an X axis direction and a Z axis direction by an actuator (not shown) for focus servo and tracking servo. Light reflected by a reflective surface of the optical disk D is transmitted again through the objective lens 5 and the phase plate 7, transformed into linearly polarized light having a polarization plane perpendicular to the document face, transmitted through the liquid crystal lens element 10, and by the collimator lens 4, a part of the light is transmitted through the beam splitter 3 and converged on a light-receiving plane of the photodetector 6.

Then, writing and/or reading operations of the optical head device 40 employing the liquid crystal lens element 10 of the present invention, to single layer and double layer DVD optical disks D having different cover thicknesses, are described as follows.

(i) In a case of a single layer DVD optical disk (cover thickness 0.60 mm):

Since the objective lens 5 is designed to minimize its aberration for a single layer optical disk D having a cover thickness of 0.60 mm, an AC voltage $V_0$ is applied between the electrodes of the liquid crystal lens element 10 at a time of writing and/or reading to/from the single layer disk D. At this time, since the refractive indexes of the liquid crystal layer 16A and the concave-convex portion 17 in the liquid crystal lens element 10 (refer to FIG. 1) are the same, as shown in FIG. 4(B), transmission wavefront does not change from incident wavefront into the liquid crystal lens 10. Namely, light is efficiently converged on an information recording layer with a cover thickness of 0.60 mm by the objective lens 5.

(ii) In a case of double layer DVD optical disk (cover thickness 0.57 mm):

At a time of writing and/or reading to/from an information recording layer with a cover thickness of 0.57 mm in a double layer optical disk, an AC voltage $V_{-1}$ is applied between the transparent electrodes so that transmission wavefront through the liquid crystal lens element 10 becomes a slightly converging spherical wave.

At this time, since the refractive index of the liquid crystal layer 16A becomes smaller than that of the concave-convex portion 17, as shown in FIG. 4(C), a transmission wavefront having a positive power, namely, corresponding to a convex lens, is generated. Namely, by the objective lens 5, light is efficiently converged on an information recording layer with the cover thickness of 0.57 mm.

(iii) In a case of double layer DVD optical disk (cover thickness 0.63 mm):

On the other hand, at a time of writing and/or reading to/from an information recording layer with a cover thickness of 0.63 mm in a double layer optical disk, an AC voltage $V_{+1}$ is applied between the electrodes so that transmission wavefront through the liquid crystal lens element 10 becomes slightly diverging spherical wave.

At this time, since the refractive index of the liquid crystal layer 16 is larger than that of the concave-convex portion 17, as shown in FIG. 4(A), a transmission wavefront having a negative power, namely, corresponding to a concave lens, is generated. Namely, by the objective lens 5, light is efficiently converged on the information recording layer with the cover thickness of 0.63 mm.

Accordingly, by switching application voltage to the liquid crystal lens element 10 among $V_0$, $V_{+1}$ and $V_{-1}$, stable writing and/or reading to/from a single layer DVD optical disk and a double layer DVD optical disk having different cover thicknesses, is realized.

Thus, according to the optical head device 40 according to this embodiment, the liquid crystal lens element 10 can add not only a function of correction of spherical aberration generated due to the difference of cover thickness of an optical disk D but also a function of switching a power component corresponding to change of focal point. Accordingly, there occurs little deterioration of aberration even in a case where the liquid crystal lens element 10 is disposed separately from the objective lens 5 for use and misalignment occurs between the objective lens 5 and the liquid crystal lens element 10 when the objective lens 5 moves in a radial direction of the optical disk D for tracking. As a result, more stable writing and/or reading is realized as compared with conventional liquid crystal lens elements correcting only spherical aberration.

Here, in this embodiment, the optical head device 40 is described, which employs the liquid crystal lens element 10 employing a laser diode of wavelength $\lambda$ in 660 nm wavelength band as a light source and operates for single layer and double layer DVD optical disks, but equivalent function and effect are obtained in an optical head device employing a liquid crystal lens element employing a laser diode of 405 nm wavelength band as a light source and operating for single layer and double layer BD optical disks.

Further, when the liquid crystal lens element 20 of the second embodiment shown in FIG. 5 is employed instead of the liquid crystal lens element 10, since its transmission wavefront can be switched among five types, it is possible to more precisely correct an aberration generated due to the difference of cover thicknesses between optical disks or due to variation of cover thickness in an optical disk.

Further, if the liquid crystal lens element 30 of the third embodiment shown in FIG. 8 is employed instead of the liquid crystal lens element 10, since there is a correction function to not only polarized light in the outgoing path but also perpendicularly polarized light in the returning path, convergence to the photodetector is improved.

Further, not only for single layer and double layer optical disks but also for optical disk having further multilayered information recording layers, it is possible to correct an aberration generated due to cover thickness by employing the liquid crystal lens element of 5 focal lengths or 7 focal lengths of the present invention and switching a voltage applied between two electrodes.

EXAMPLES

Example 1

Then, a specific example of the liquid crystal lens element 10 of the present invention shown in the first embodiment, is described with reference to FIG. 1.

First of all, a specific production process of the liquid crystal lens element 10 is described.

On a glass substrate being a transparent substrate 11, a film of $SiO_xN_y$ is formed by a sputtering method. Here, by using a Si sputtering target and using a arcing gas formed by mixing oxygen and nitrogen into Ar gas, a $SiO_xN_y$ film is formed, which has a refractive index $n_s(=1.64)$ and which is a transparent and uniform refractive index film having a film thickness of d(=5.5 μm).

Further, a resist is patterned by a photolithography method using a photomask so as to have a shape corresponding to graph β of FIG. 3, and by a reactive ion etching method, the $SiO_xN_y$ film is fabricated. As a result, in a region of effective diameter φ(=5.0 mm), a concave-convex portion 17 having a cross-section of Fresnel lens approximated by a step shape of eight steps shown in FIG. 1, is formed.

Then, a transparent conductive film (ITO film) is formed on a surface of the concave-convex portion 17, as a first transparent electrode 13. Further, a polyimide film (not shown) is coated on the first transparent electrode 13 so as to have a film thickness of about 50 nm and baked, and the surface of the polyimide film is subjected to a rubbing treatment in X axis direction to form an alignment film.

Further, on a glass substrate being a substrate 12, a transparent conductive film (ITO film) is formed as a second transparent electrode 14, a polyimide film (not shown) is applied to have a film thickness of about 50 nm and baked, and a surface of the polyimide film is subjected to a rubbing alignment treatment in X axis direction.

Further, on the surface, an adhesive agent in which a gap control material having a diameter of 8 μm is mixed, is patterned by printing to form a seal 15, and a transparent substrate 11 is laminated and press-bonded to form an empty cell in which the distance between the first transparent electrode 13 and the second transparent electrode 14 is at most 8 μm and at least 2.5 μm.

Thereafter, a liquid crystal 16 is injected through an injection port (not shown) of the empty cell, and the injection port is sealed to form a liquid crystal layer 16 to obtain a liquid crystal lens element 10 shown in FIG. 1.

For the liquid crystal 16, a nematic liquid crystal having an ordinary refractive index $n_o(=1.50)$, an extraordinary refractive index $n_e(=1.75)$ and positive dielectric anisotropy, is employed. Further, the liquid crystal 16 has a homogeneous alignment in which liquid crystal molecules are uniformly in parallel with the planes of the first and second transparent electrodes 13 and 14 and in the direction of X axis, and the liquid crystal 16 fills concave portions of the concave-convex portion 17.

By connecting an AC power source 18 to the first and the second transparent electrodes 13 and 14 of the liquid crystal lens element 10 thus obtained, a voltage is applied to the liquid crystal layer 16A. When the applied voltage is increased from 0 V, an effective refractive index of the liquid crystal layer 16A in X axis direction changes from $n_1=n_e$ (=1.75) to $n_2=n_o$(=1.50). As a result, a refractive index difference between the liquid crystal layer 16A and the concave-convex portion 17 for linearly polarized incident light vibrating in X axis direction and propagating in z axis direction, changes from $n_1-n_s=0.11$ to $n_2-n_s=-0.14$ and a transmission wavefront changes depending on the thickness distribution of the liquid crystal layer 16 filling concave portions of the concave-convex portion 17.

Here, for example, when an objective lens designed to have zero aberration for a single layer DVD optical disk having a cover thickness of 0.60 mm at a wavelength λ(=660 nm) in use, and having a numerical aperture (NA) of 0.65 and a focal length of 3.05 mm, is used for a double layer DVD optical disk having cover thicknesses 0.57 mm and 0.63 mm, a spherical aberration corresponding to a maximum optical path difference of 0.15λ and an RMS wavefront aberration of 43 mλ [rms], is generated.

Then, in order to correct this spherical aberration using the liquid crystal lens element 10, the concave-convex portion 17 is fabricated so that a transmission wavefront at no applied voltage corresponds to the optical path difference OPD of graph β corresponding to graph α of FIG. 3 represented by Formula (3) using parameters $a_1$ to $a_5$ shown in Table 1 below. Here, in Formula (3), the unit of optical path difference OPD is [μm] and the unit of r is [mm].

TABLE 1

| Parameter | Value |
| --- | --- |
| $a_1$ | −0.744431 |
| $a_2$ | 0.004292 |
| $a_3$ | −0.004880 |
| $a_4$ | 0.001341 |
| $a_5$ | −0.000112 |

In Table 1, a parameter a1 corresponds to a power component, and parameters a2 to a5 correspond to spherical aberration components. Accordingly, the optical path difference of graph β generated by the liquid crystal lens element 10 contain a power component and spherical aberration components.

Here, since the refractive index difference $\Delta n(V_{+1})$ between the liquid crystal 16 and the concave-convex portion 17 at a time of no voltage application, namely, at a voltage $V_{+1}=0$, is as described above:

$$\Delta n(V_{+1}) = n_1 - n_s = 0.11$$

then, in order to produce the above-mentioned transmission wavefront by the concave-convex portion 17 and the liquid crystal 16 filling its concave portions, a depth d (μm) of the concave-convex portion 17 is determined so as to satisfy Formula (2) when m=1. In this example, the concave-convex portion 17 is approximated by a step shape of 8 steps and d=5.5 μm.

A transmission wavefront of wavelength λ(=660 nm) for DVD incident into the liquid crystal lens element 10, becomes a diverging wavefront as shown in FIG. 4(A) at a time of no voltage application ($V_{+1}=0$), and the element shows a function of concave lens having a focal length (f) of f=−675 mm. Then, when the applied voltage is increased, Δn becomes $\Delta n(V_0)=0$ at about $V_0=1.8$ V, and the transmission wavefront is, as shown in FIG. 4(B), transmitted with the same wavefront as the incident wavefront (having no power). When the applied voltage is further increased, Δn becomes $\Delta n(V_{-1})=-\Delta n(V_{+1})$ at about $V_{-1}=4.4$ V, and the transmission wavefront becomes a converging wavefront as shown in FIG. 4(C), and the element shows a function of convex lens having a focal length (f) of f=+675 mm.

In this case, generation-efficiencies of transmission wavefronts generated at the switching applied voltages $V_{+1}, V_0$ and $V_{-1}$ shown in FIGS. 4(A), 4(B) and 4(C), are calculated to be 95%, 100% and 95% respectively.

Example 2

Then, a specific example of the optical head device 40 of the fourth embodiment shown in FIG. 9 employing the liquid crystal lens element 10 of Example 1, is described. Here, the construction of the optical head device 40 is described in the fourth embodiment, and thus, the explanation is omitted.

At a time of writing and/or reading an information to/from a single layer DVD optical disk D having a cover thickness of 0.60 mm using the optical head device 40, when the applied voltage to the liquid crystal lens element 10 is set to be about $V_0=1.8$ V, incident light is efficiently converged on an information recording layer by an objective lens 5.

For a double layer DVD optical disk D, when a voltage of about $V_{+1}(=0$ V$)$ is applied to the liquid crystal lens element 10, incident light is converged on an information recording layer of a cover thickness of 0.63 mm, and when a voltage of about $V_{-1}(=4.4$ V$)$ is applied, incident light is converged on an information recording layer of a cover thickness of 0.57 mm. In each case, residual RMS wavefront aberration is calculated to be at most 3 m$\lambda$ [rms].

Figure 10:
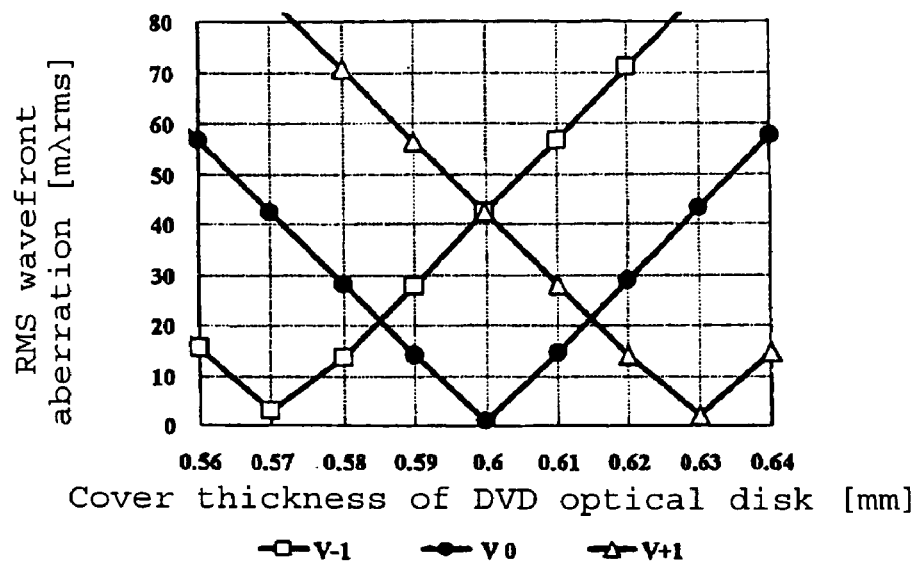
FIG. 10: A graph showing calculated wavefront aberrations generated to DVD optical disks having different cover thicknesses when an optical head device employing the liquid crystal lens element of the present invention is used.

Then, FIG. 10 shows a calculation result of residual RMS wavefront aberration in a case of using transmission wavefronts generated in response to applied voltages $V_0$, $V_{-1}$ and $V_{+1}$ to the liquid crystal lens element 10, for an optical disk having a cover thickness of from 0.56 mm to 0.64 mm.

Accordingly, when the cover thickness is within a range of from 0.56 mm to 0.585 mm, by applying a voltage $V_{-1}$, when the cover thickness is within a range of from 0.585 mm to 0.615 mm, by applying a voltage $V_0$, and when the cover thickness is within a range of from 0.615 mm to 0.64 mm, by applying a voltage $V_{+1}$, residual RMS wavefront aberration is reduced to be at most about 20 m$\lambda$ [rms].

Further, when the objective lens 5 moves about ±0.3 mm in a radial direction of an optical disk D for tracking, a misalignment to the liquid crystal lens 10 occurs, but since no aberration is generated by the misalignment, no deterioration of converging spot is generated.

Accordingly, by switching an applied voltage among voltages $V_0$, $V_{+1}$ and $V_{-1}$ to the liquid crystal lens element 10, an optical head device is realized, which can stably write and read single layer and double layer DVD optical disks D.

Example 3

Then, a specific Example of the liquid crystal lens element 30 of the present invention shown in the third embodiment, is described as follows with reference to FIG. 8.

The liquid crystal lens element 30 comprises first and second liquid crystal lens elements 10A and 10B, and these liquid crystal lens elements 10A and 10B are produced in the same manner as the liquid crystal lens element 10 shown in Example 1.

The liquid crystal lens element 30 of this example is employed in an optical head device for writing and/or reading to/from a single layer and a double layer BD optical disks employing laser light of 405 nm wavelength band, and is used for the purpose of correcting an aberration generated due to the difference of cover thicknesses of optical disks. Accordingly, element construction of the first and the second liquid crystal lens elements 10A and 10B, is different from that of the liquid crystal lens element 10 of Example 1.

Specifically, in the first and the second liquid crystal lens elements 10A and 10B, in the same manner as the liquid crystal lens element 20 described in the second embodiment, the maximum depth d of each of the concave-convex portions 17C and 17D, is the maximum depth corresponding to m=2 of Formula (2).

Namely, for the concave-convex portions 17C and 17D, a $SiO_xN_y$ film as a uniform refractive index transparent material of refractive index $n_s(=1.70)$ having a film thickness d(=5.9 μmm) is employed. Further, in a region of effective diameter $\phi(=4.0$ mm$)$, concave-convex portions 17C and 17D corresponding to the concave-convex portion 17B having a cross-section of Fresnel lens shape approximated by a step shape of 16 steps shown in FIG. 5 are fabricated. Further, for the liquid crystal 16, a nematic liquid crystal having an ordinary refractive index $n_o(=1.53)$ and an extraordinary refractive index $n_e(=1.83)$ and having a positive dielectric anisotropy, is employed. Here, alignment films (not shown) in contact with the liquid crystal 16 are subjected to an alignment treatment so that at a time of no voltage application, alignment of liquid crystal molecules in the liquid crystal layer 16C is uniformly in X axis direction and alignment of liquid crystal molecules in the liquid crystal layer 16D is uniformly in Y axis direction. Further, the distance between the first transparent electrode and the second transparent electrode of each of the first and the second liquid crystal lens elements 10A and 10B, is at most 8 μm and at least 2.1 μm.

In the liquid crystal lens element thus obtained, the first transparent electrodes 13A and 13B are connected and the second transparent electrodes 14A and 14B are connected, and a voltage is applied between the first and second transparent electrodes by an AC power source. When the applied voltage is increased from 0 V, substantial refractive index of the liquid crystal layer 16C in X axis direction and substantial refractive index of the liquid crystal layer 16D in Y axis direction change from $n_1=n_e(=1.83)$ to $n_2=n_o(=1.53)$. On the other hand, substantial refractive index of the liquid crystal layer 16C in Y axis direction and that of the liquid crystal layer 16D in X axis direction, do not change from $n_o(=1.53)$ regardless of applied voltage.

As a result, for linearly polarized incident light thus incident into the first liquid crystal lens element 10A and having a polarization plane in X axis direction, and for linearly polarized incident light incident into the second liquid crystal lens element 10B and having a polarization plane in Y axis direction, refractive index difference between the liquid crystal layer 16C and the concave-convex portion 17C and refractive index difference between the liquid crystal layer 16D and the concave-convex portion 17D, each changes from $n_1-n_s=0.13$ to $n_2-n_s=-0.17$, whereby transmission wavefront changes according to the thickness distribution of the liquid crystal layers 16C and 16D filling concave portions of the concave-convex portions 17C and 17D respectively.

Here, for example, when an objective lens of NA0.85 having a focal length of 1.882 mm designed to have zero aberration for an optical disk having a cover thickness of 87.5 μm at a wavelength $\lambda(=405$ nm$)$, is used for single and double layer BD optical disks having cover thicknesses 100 μm and 75 μm, a spherical aberration having a maximum optical path difference of about 0.43$\lambda$ corresponding to an RMS wavefront aberration of about 125 m$\lambda$ [rms], is generated.

Then, in order to correct the spherical aberration by the first liquid crystal lens element 10A for linearly polarized incident light vibrating in X axis direction and propagating in z axis direction, and by the second liquid crystal lens element 10B for linearly polarized incident light vibrating in Y axis direction and propagating in z axis direction, the concave-convex portions 17C and 17D are fabricated so that transmission wavefront at a time of no voltage application becomes the optical path difference OPD of graph β2 corresponding to graph α of FIG. 6 represented by Formula (3) using parameters $a_1$ to $a_5$ shown in Table 2. Here, the unit of the optical path difference OPD is [μm] and the unit of r is [mm].

TABLE 2

| Parameter | Value |
|---|---|
| $a_1$ | −0.827770 |
| $a_2$ | −0.008058 |
| $a_3$ | 0.008250 |
| $a_4$ | −0.003671 |
| $a_5$ | 0.001242 |

Here, at a voltage $V_{+2}=0$ at a time of no voltage application, since $\Delta n(V_{+2})$ being a refractive index difference between the liquid crystal layer 16C and the concave-convex portion 17C for linearly polarized light vibrating in X axis direction and propagating z axis direction, and being a refractive index difference between the liquid crystal layer 16D and the concave-convex portion 17D for linearly polarized light vibrating in Y axis direction and propagating in z axis direction, is as described above:

$$\Delta n(V_{+2})=n_1-n_s=0.13,$$

the maximum depth d of the concave-convex portions 17C and 17D are determined so as to satisfy m=2 in Formula (2) in order to produce the above-mentioned transmission wavefront by the concave-convex portions 17C and 17D and liquid crystal layers 16C and 16D filling their concave portions. Here, in this example, the concave-convex portions 17C and 17D each has a Fresnel lens shape approximated by a step shape of 6 steps, and d=5.9 µm.

Here, for linearly polarized incident light corresponding to ordinary refractive index of the liquid crystal layers 16C and 16D, a refractive index difference of $n_o-n_s=-0.17$ is formed between the liquid crystal layer 16C and the concave-convex portion 17C and between the liquid crystal layer 16D and the concave-convex portion 17D regardless of the magnitude of applied voltage, and accordingly, a fixed wavefront is generated. In order to cancel such a fixed wavefront, a surface of the transparent substrate 12B is fabricated to have a concave-convex portion (not shown) having a cross-sectional shape equivalent to that of the concave-convex portion 17D. Specifically, a surface of the quartz transparent substrate 12B having a refractive index $n_g=1.46$, is fabricated to have a concave-convex shape having a maximum depth of 2.23 µm.

To the liquid crystal lens element 30 thus obtained, laser light of wavelength $\lambda(=405$ nm) for BD is incident.

(i) As a result, regardless of polarization state of incident light, transmission wavefront becomes a diverging wavefront shown in FIG. 7(A) at a time of no voltage application $(V_{+2}=0)$ and the element shows a concave lens function having an optical path difference corresponding to graph β2 of FIG. 6 and having a focal length (f) of f=−616 mm.

(ii) Then, when the applied voltage is increased, Δn becomes $\Delta n(V_{+1})=\Delta n(V_{+2})/2$ at about $V_{+1}=1.4$ V, and the transmission wavefront becomes a diverging wavefront shown in FIG. 7(B). The transmission wavefront has an optical path difference corresponding to graph β1 of FIG. 6, and the element shows a concave lens function having a focal length (f) of f=−1232 mm.

(iii) Further, Δn becomes $\Delta n(V_0)=0$ at about V=1.7 V, and the transmission wavefront is unchanged from incident wavefront (no power) as shown in FIG. 7(C).

(iv) When the applied voltage is further increased, Δn becomes $\Delta n(V_{-1})=-\Delta n(V_{+1})$ at about $V_{-1}=2.3$ V, the transmission wavefront becomes a converging wavefront shown in FIG. 7(D), and the element shows a concave lens function having an optical path difference corresponding to graph γ1 of FIG. 6 and having a focal length (f) of f=+1232 mm.

(v) When the applied voltage is further increased, Δn becomes $\Delta n(V_{-2})=-\Delta n(V_{+2})$ at about $V_{-2}=4.5$ V, and the transmission wavefront becomes a converging wavefront shown in FIG. 7(E), and the element shows a convex lens function having an optical path difference corresponding to graph γ2 of FIG. 6 and corresponding to focal length (f) of f=+616 mm.

Figure 7:
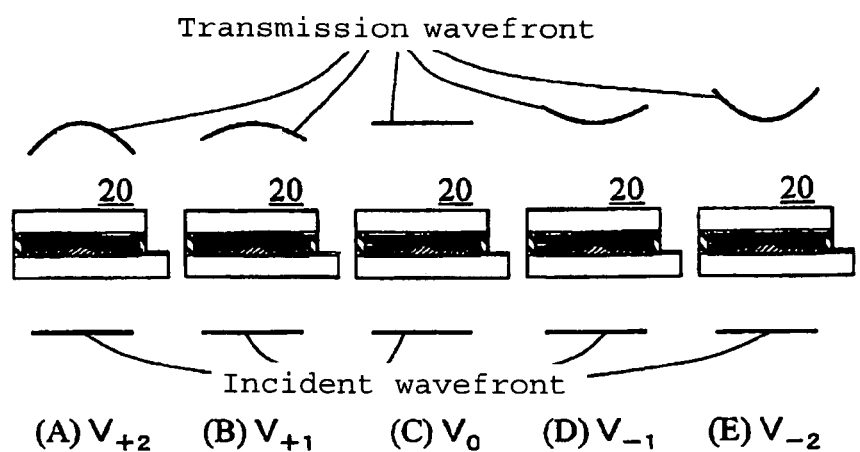

Here, calculated values of generation efficiencies of transmission wavefronts shown in FIGS. 7(A), 7(Bb), 7(C), 7(D) and 7(E) generated at switched applied voltages $V_{+2}, V_{+1}, V_0, V_{-1}$ and $V_{-2}$ are 95%, 98%, 100%, 98% and 95% respectively.

Example 4

Then, an example of the optical head device 40 of the fourth embodiment shown in FIG. 9, employing the liquid crystal lens element 30 of Example 3 instead of the liquid crystal lens element 10, is described.

In this example, a laser diode 1 of wavelength $\lambda(=405$ nm) for BD is used as a light source, and as the optical disk D, single layer and double layer BD optical disks are used. Further, the objective lens 5 is designed to have minimum aberration for an optical disk having a cover thickness of 87.5 µm.

In a case of writing and/or reading an information to/from single layer and double layer BD optical disks D having a cover thickness of 100 µm, if application voltage to the liquid crystal lens element 30 is set to be about $V_{+2}(=0$ V), incident light is converged on a plane of cover thickness 101.5 µm by the objective lens 5. At this time, on an information recording layer of a cover thickness of 100 µm, calculated value of residual RMS wavefront aberration becomes at most 20 mλ [rms], and it is possible to write and/or read single layer and double layer BD optical disks D having a cover thickness of 100 µm.

On the other hand, in a case of writing and/or reading an information to/from a double layer BD optical disk D having a cover thickness of 75 µm, when the applied voltage to the liquid crystal lens element 30 is set to be about $V_{-2}=4.5$ V, incident light is converged on a plane of cover thickness 73.5 µm. At this time, calculated value of residual RMS wavefront aberration on an information recording layer of cover thickness 75 µm, becomes at most 20 mλ [rms], and it is possible to write and/or read the double layer BD optical disk D having a cover thickness of 75 µm.

Figure 11:
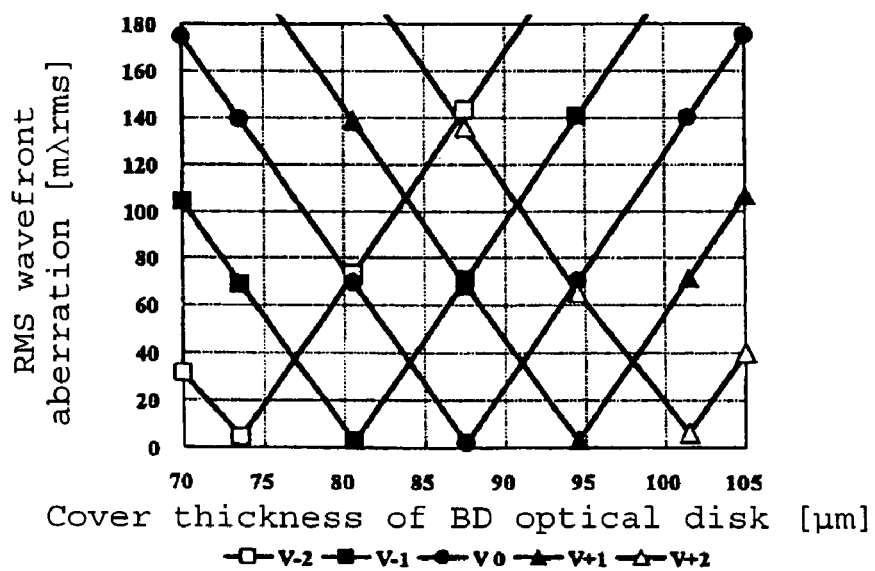
FIG. 11: A graph showing calculated wavefront aberrations generated to BD optical disks having different cover thicknesses when an optical head device employing the liquid crystal lens element of the present invention, is used.
Figure 12:
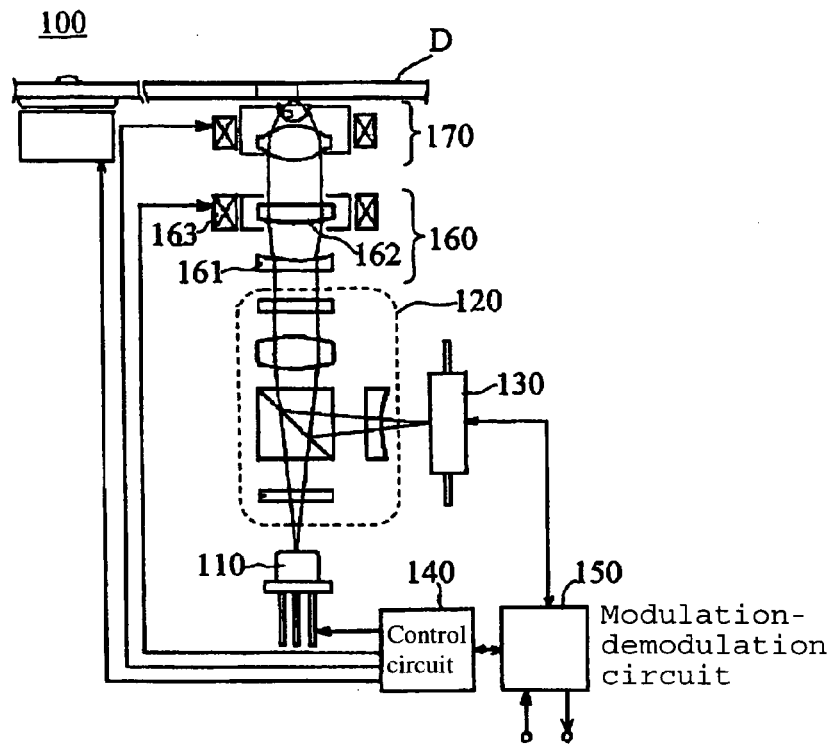
FIG. 12: A construction view showing a conventional optical head device employing a movable lens group.
Figure 13:
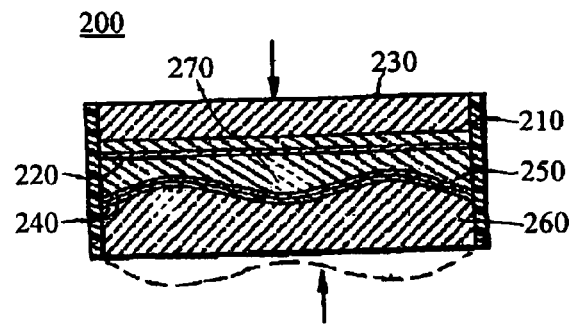
FIG. 13: A vertical cross-sectional view showing an example of the construction of a conventional liquid crystal lens.
Figure 14:
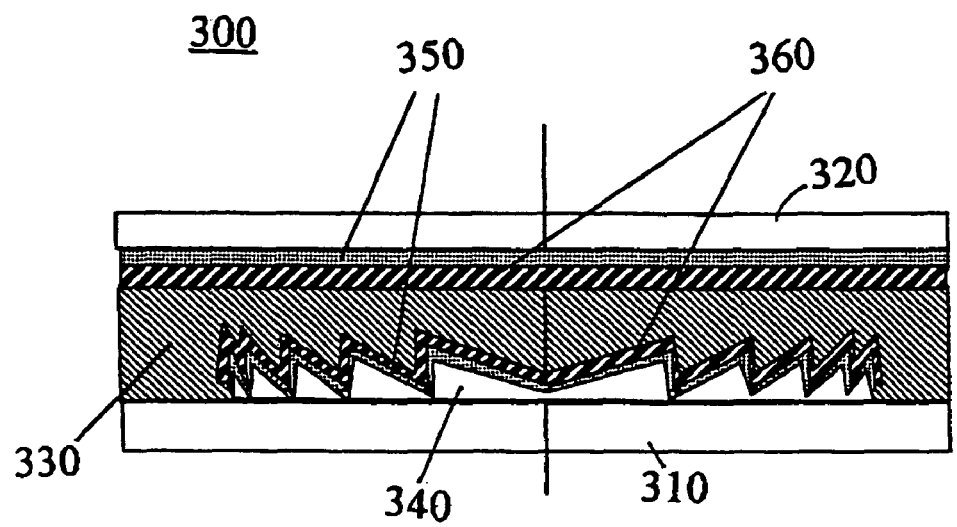
FIG. 14: A vertical cross-sectional view showing an example of the construction of the conventional optical modulation element (liquid crystal diffraction lens).

Then, in a case where transmission wavefronts generated at applied voltages $V_{+2}, V_{+1}, V_0, V_{-1}$ and $V_{-2}$ respectively to the liquid crystal lens element 30, is used for BD optical disks having a cover thickness of from 70 µm to 105 µm, calculated results of residual RMS wavefront aberrations are shown in FIG. 11.

Accordingly, according to the Figure, at an applied voltage $V_{+2}$ when the cover thickness is within a range of from 70 µm to 77 µm, at an applied voltage $V_{+1}$ when the cover thickness is within a range of from 77 µm to 84 µm, at an applied voltage $V_0$ when the cover thickness is within a range of from 84 µm to 91 µm, at an applied voltage $V_{-1}$ when the cover thickness is within a range of from 91 µm to 98 µm, and further, at an applied voltage $V_{-2}$ when the cover thickness is within a range of from 98 µm to 105 µm, the respective residual RMS wavefront aberrations decrease to be at most 35 mµ [RMS].

Accordingly, by switching a voltage applied to the liquid crystal lens element 30 among $V_{+2}, V_{+1}, V_0, V_{-1}$ and $V_{-2}$, an optical head device capable of stably writing and/or reading to/from single layer and double layer optical disks D for BD, is realized.

Further, when the objective lens 5 moves about ±0.3 mm in a radial direction of the optical disk D for tracking, a misalignment occurs between the objective lens 5 and the liquid crystal lens 30 but since there is no aberration generated due to the misalignment, there is no deterioration of convergence spot.

Here, the present invention is by no means limited to the above-mentioned embodiments, and the present invention may be carried out in various embodiments within a range not departing from the gist of the present invention.

INDUSTRIAL APPLICABILITY

The liquid crystal lens element of the present invention may be used as a lens having a focal length switchable among a plurality of focal lengths such as 3 focal lengths, 5 focal lengths or 7 focal lengths according to the magnitude of applied voltage. Particularly, the liquid crystal lens element of the present invention may be used as a liquid crystal lens element for correcting a spherical aberration containing a power component generated at a time of writing and/or reading to/from optical disks having different cover thicknesses and having single layer and double layer information recording layers.

Further, by employing the liquid crystal lens element of the present invention in an optical head device, since there is no aberration generated even when the liquid crystal lens element and the objective lens are misaligned, limitation of the arrangement is loosened and the liquid crystal lens of the present invention can be applied to an optical head device of small size and capable of stably writing and/or reading to/from an optical disk.

The entire disclosure of Japanese Patent Application No. 2004-136075 filed on Apr. 30, 2004 including specification, claims, drawings and summary is incorporated herein by reference in its entirety.

What is claimed is:

1. A liquid crystal lens element comprising a pair of opposing transparent electrodes and a liquid crystal layer sandwiched between these transparent electrodes, wherein a converging point of light transmitted through the liquid crystal layer is changed according to a magnitude of voltage applied to the liquid crystal layer;

the liquid crystal lens element being characterized in that the liquid crystal lens element comprises a Fresnel lens formed on a flat surface of one of the transparent substrates opposed to the other substrate, a first transparent electrode formed on a concave-convex shaped surface of the Fresnel lens, and a second transparent electrode formed on a flat surface of said other transparent substrate opposed to said one of the transparent substrate; according to a voltage V applied between the first transparent electrode and the second transparent electrode sandwiching the liquid crystal layer, substantial refractive index n(V) of the liquid crystal layer for linearly polarized incident light having a predetermined wavelength $\lambda$ changes from a refractive index $n_1$ at a time of no voltage application to a sufficiently saturated refractive index $n_2$ ($n_1 \neq n_2$) which is not fluctuated by fluctuation of the applied voltage; the Fresnel lens is formed to have a thickness d satisfying a relation $d \geq 0.75 \times \lambda/\delta n$ provided that the refractive index $n_s$ of the Fresnel lens is a value between the refractive indexes $n_1$ and $n_2$, and that the refractive index differences $|n_1-n_s|$ and $|n_2-n_s|$ between the Fresnel lens and the liquid crystal layer, whichever smaller, is designated as $\delta n$; and there present focal lengths corresponding to M levels (here, M is an integer of at least 3) of specific applied voltages among voltages V applied between the first transparent electrode and the second transparent electrode.

2. An optical lens element according to claim 1, wherein the Fresnel lens is formed so that the refractive index $n_s$ of the Fresnel lens, $n_1$ and $n_2$ satisfy a relational formula $|n_1-n_s| \leq |n_2-n_s|$, and the thickness d of the Fresnel lens satisfies a relational formula:

$$(m-0.25) \times \lambda \leq |n_1-n_s| \times d \leq (m+0.25) \times \lambda \quad (2)$$

(wherein m=1, 2 or 3),
and provided that a refractive index $n(V_k)$ of the liquid crystal layer satisfies the following relation at a time of applying the specific applied voltage $V_k$:

$$n(V_k)=n_1+[(m-k)\times(n_s-n_1)]/m$$

(wherein k is an integer satisfying $-m \leq k \leq m$),
the M is represented by 2m+1, and M types of focal lengths are present, which corresponds to M levels of applied voltages $V_k$.

3. The liquid crystal lens element according to claim 1, wherein the Fresnel lens has a shape approximated by steps.

4. The liquid crystal lens element according to claim 1, wherein the Fresnel lens is made of a birefringent material, the extraordinary refractive index of the birefringent material corresponds to the refractive index $n_s$, and the ordinary refractive index of the birefringent material equals to the ordinary refractive index of the liquid crystal layer.

5. The liquid crystal lens element according to claim 1, wherein the Fresnel lens is made of $SiO_xN_y$ (wherein $0 \leq x \leq 2$, $0 \leq y \leq 1$, and $0 \leq x+y$).

6. An optical head device comprising a light source for emitting light of wavelength $\lambda$, an objective lens for converging light emitted from the light source on an information recording medium, a beam splitter for splitting light converged on the objecting lens and reflected by the optical recording medium, and a photodetector for detecting the split light; the optical head device being characterized by comprising the liquid crystal lens element as defined in claim 1, in an optical path between the light source and the objective lens.

7. The optical head device according to claim 6, wherein the optical recording medium has a cover layer covering an information recording layer, and the optical head device carries out writing and/or reading to/from the optical recording mediums having different cover thicknesses.

8. A method of using optical head device, which is a method of using an optical head device comprising a light source for emitting light of wavelength $\lambda$, an objective lens for converging light emitted from the light source on an information recording medium, a beam splitter for splitting light converged by the objective lens and reflected by the information recording medium, and a photodetector for detecting the split light; the method being characterized in that the liquid crystal lens element as defined in claim 1 is disposed in an optical path between the light source and the objective lens, and a specific applied voltage $V_k$ among M voltages (wherein M is an integer of at least 3) is applied between the transparent electrodes of the liquid crystal lens element.

9. A method of using optical head device, which is a method of using the optical head device as defined in claim 6 for writing and/or reading to/from optical recording mediums having cover layers of different thicknesses each covering an information recording layer, wherein a specific applied voltages $V_k$ among M voltages (wherein M is an integer of at least 3) is applied between the transparent electrodes of the liquid crystal lens element employed in the optical head device.

* * * * *